United States Patent
Tani

(10) Patent No.: US 9,323,978 B2
(45) Date of Patent: Apr. 26, 2016

(54) IMAGE PROCESSING DEVICE, ENDOSCOPE APPARATUS, AND IMAGE PROCESSING METHOD

(71) Applicant: OLYMPUS CORPORATION, Tokyo (JP)

(72) Inventor: Shinsuke Tani, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/314,699

(22) Filed: Jun. 25, 2014

(65) Prior Publication Data
US 2015/0003742 A1 Jan. 1, 2015

(30) Foreign Application Priority Data

Jun. 27, 2013 (JP) ................................. 2013-134730

(51) Int. Cl.
| | |
|---|---|
| G06K 9/00 | (2006.01) |
| G06K 9/46 | (2006.01) |
| G06K 9/20 | (2006.01) |
| G06K 9/40 | (2006.01) |
| G06K 9/48 | (2006.01) |
| G06T 7/00 | (2006.01) |

(52) U.S. Cl.
CPC .............. *G06K 9/00214* (2013.01); *G06K 9/20* (2013.01); *G06K 9/40* (2013.01); *G06K 9/48* (2013.01); *G06T 7/0012* (2013.01); *G06K 2209/051* (2013.01); *G06T 2207/10068* (2013.01); *G06T 2207/30028* (2013.01)

(58) Field of Classification Search
USPC ................................................ 382/203, 132
See application file for complete search history.

(56) References Cited

U.S. PATENT DOCUMENTS

| | | | | |
|---|---|---|---|---|
| 6,970,585 | B1 * | 11/2005 | Dafni et al. ................... | 382/131 |
| 2002/0191074 | A1 * | 12/2002 | Ogawa ............... | A61B 1/00096 |
| | | | | 348/65 |
| 2009/0148017 | A1 * | 6/2009 | Inoue ....................... | A61B 1/04 |
| | | | | 382/128 |
| 2009/0220133 | A1 * | 9/2009 | Sawa .................... | G06T 7/0012 |
| | | | | 382/128 |
| 2010/0079757 | A1 * | 4/2010 | Murooka ............. | G01B 11/306 |
| | | | | 356/369 |
| 2010/0104156 | A1 * | 4/2010 | Yoshida ................ | G06T 7/0012 |
| | | | | 382/128 |

(Continued)

FOREIGN PATENT DOCUMENTS

| | | |
|---|---|---|
| JP | 2003-088498 A | 3/2003 |
| WO | 2014/097702 A1 | 6/2014 |
| WO | 2014/132474 A1 | 9/2014 |

*Primary Examiner* — Kathleen Y Dulaney
(74) *Attorney, Agent, or Firm* — Scully, Scott, Murphy & Presser, P.C.

(57) ABSTRACT

An image processing device includes an image acquisition section that acquires a captured image, the captured image having been captured by an imaging section, and including an image of an object, a distance information acquisition section that acquires distance information based on the distance from the imaging section to the object when the imaging section has captured the captured image, a known characteristic information selection section that selects known characteristic information corresponding to a motion amount, and outputs the selected known characteristic information, the known characteristic information being information that indicates known characteristics relating to the structure of the object, and a concavity-convexity information extraction section that extracts information that indicates a concavity-convexity part of the object that meets the characteristics specified by the selected known characteristic information from the distance information as extracted concavity-convexity information.

12 Claims, 16 Drawing Sheets

(56) References Cited

U.S. PATENT DOCUMENTS

| | | | |
|---|---|---|---|
| 2011/0123077 A1* | 5/2011 | Goto | A61B 6/5247 382/128 |
| 2012/0002879 A1* | 1/2012 | Kanda | G06T 7/0012 382/195 |
| 2012/0008839 A1* | 1/2012 | Hirota | G06T 7/0012 382/128 |
| 2012/0076374 A1* | 3/2012 | Tanaka | A61B 1/0646 382/128 |
| 2013/0258080 A1* | 10/2013 | Kuriyama | A61B 1/00009 348/65 |

* cited by examiner

LOW-PASS FILTERING RESULTS

SUBTRACTION

CHANGE CHARACTERISTICS OF LOW-PASS FILTER
CORRESPONDING TO DISTANCE

CLOSING PROCESS

DETECTION OF CONCAVITIES

OPENING PROCESS

DETECTION OF CONVEXITIES

CHANGE RADIUS OF SPHERE CORRESPONDING TO DISTANCE

IMAGE PROCESSING DEVICE, ENDOSCOPE APPARATUS, AND IMAGE PROCESSING METHOD

Japanese Patent Application No. 2013-134730 filed on Jun. 27, 2013, is hereby incorporated by reference in its entirety.

BACKGROUND

The present invention relates to an image processing device, an endoscope apparatus, an image processing method, and the like.

The state of small concavities and convexities on the surface of tissue is normally observed when determining whether or not a lesion (e.g., an early lesion in the digestive tract) is benign or malignant, or determining the range of the lesion using an endoscope apparatus. A method has been normally used that enhances the contrast of concavities and convexities by spraying a dye so that the concavities and convexities can be easily found. However, since the dye spraying operation is cumbersome for the doctor, and increases the burden imposed on the patient, it is advantageous for the doctor and the patient if concavities and convexities can be detected by image processing.

For example, JP-A-2003-088498 discloses a method that detects concavities and convexities by comparing the brightness level of an attention pixel in a locally extracted area with the brightness level of its peripheral pixel, and coloring the attention area when the attention area is darker than the peripheral area. The method disclosed in JP-A-2003-088498 is based on the assumption that a distant object is captured darkly since the intensity of reflected light from the surface of tissue decreases.

SUMMARY

According to one aspect of the invention, there is provided an image processing device comprising:

an image acquisition section that acquires a captured image, the captured image having been captured by an imaging section, and including an image of an object;

a distance information acquisition section that acquires distance information based on a distance from the imaging section to the object when the imaging section has captured the captured image;

a known characteristic information selection section that selects known characteristic information corresponding to the distance information, and outputs the selected known characteristic information, the known characteristic information being information that indicates known characteristics relating to a structure of the object; and a concavity-convexity information extraction section that extracts information that indicates a concavity-convexity part of the object that meets the characteristics specified by the selected known characteristic information from the distance information as extracted concavity-convexity information.

According to another aspect of the invention, there is provided an endoscope apparatus comprising the above image processing device.

According to another aspect of the invention, there is provided an image processing method comprising:

acquiring a captured image, the captured image having been captured by an imaging section, and including an image of an object;

acquiring distance information based on a distance from the imaging section to the object when the imaging section has captured the captured image;

selecting known characteristic information corresponding to the distance information, and outputting the selected known characteristic information, the known characteristic information being information that indicates known characteristics relating to a structure of the object; and extracting information that indicates a concavity-convexity part of the object that meets the characteristics specified by the selected known characteristic information from the distance information as extracted concavity-convexity information.

According to another aspect of the invention, there is provided a computer-readable storage device with an executable program stored thereon, wherein the program instructs a computer to perform steps of:

acquiring a captured image, the captured image having been captured by an imaging section, and including an image of an object;

acquiring distance information based on a distance from the imaging section to the object when the imaging section has captured the captured image;

selecting known characteristic information corresponding to the distance information, and outputting the selected known characteristic information, the known characteristic information being information that indicates known characteristics relating to a structure of the object; and extracting information that indicates a concavity-convexity part of the object that meets the characteristics specified by the selected known characteristic information from the distance information as extracted concavity-convexity information.

DESCRIPTION OF EXEMPLARY EMBODIMENTS

Figure 1:
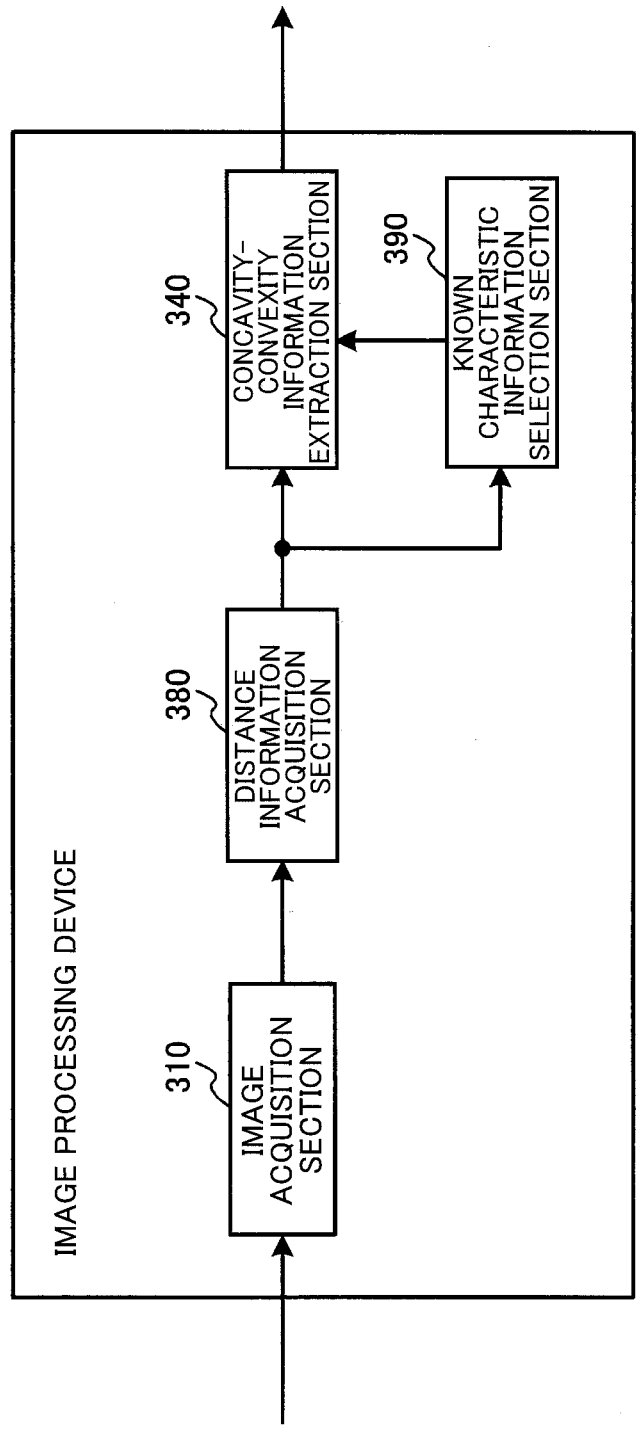
FIG. 1 illustrates a configuration example of an image processing device.

According to one embodiment of the invention, there is provided an image processing device comprising:

an image acquisition section that acquires a captured image, the captured image having been captured by an imaging section, and including an image of an object;

a distance information acquisition section that acquires distance information based on a distance from the imaging section to the object when the imaging section has captured the captured image;

a known characteristic information selection section that selects known characteristic information corresponding to the distance information, and outputs the selected known characteristic information, the known characteristic information being information that indicates known characteristics relating to a structure of the object; and a concavity-convexity information extraction section that extracts information that indicates a concavity-convexity part of the object that meets the characteristics specified by the selected known characteristic information from the distance information as extracted concavity-convexity information.

According to one embodiment of the invention, the known characteristic information is selected corresponding to the distance information, and the information that indicates the concavity-convexity part of the object that meets the characteristics specified by the selected known characteristic information is extracted from the distance information. This makes it possible to adaptively detect the concavity-convexity part corresponding to the observation state, for example.

Exemplary embodiments of the invention are described below. Note that the following exemplary embodiments do not in any way limit the scope of the invention laid out in the claims. Note also that all of the elements described in connection with the following exemplary embodiments should not necessarily be taken as essential elements of the invention.

1. Outline

When performing diagnosis using an endoscope apparatus, the user inserts the scope into the object (e.g., digestive tract), and performs screening observation. The user searches the entire object for an abnormal area (e.g., lesion, bleeding, or inflammation) during screening observation while moving the scope within the object. When the user has found an abnormal area, the user brings the scope closer to the abnormal area, and performs zoom observation (close observation). The user fixes the field of view of the scope as much as possible with respect to the object during zoom observation while increasing the observation magnification to perform examination/diagnosis (e.g., determination of the name of the disease, determination as to whether the disease is benign or malignant, and determination as to whether or not treatment is necessary) on the abnormal area.

In such a case, the user performs diagnosis taking account of the concavity-convexity structure of the object (e.g., the concavity-convexity structure on the surface of the mucous membrane). According to several embodiments of the invention, a concavity-convexity part of the object is detected by image processing, and enhanced to assist the user to perform diagnosis, for example.

However, since the size of the concavity-convexity part to which the user pays attention differs depending on the observation state, observation may be hindered if a concavity-convexity part having an identical size is always detected. For example, the user searches a convexity/concavity (e.g., polyp or cancer) or the like on the mucous membrane during screening observation, and it may be difficult for the user to find the target concavity-convexity part if a concavity-convexity part having a size smaller than that of the target concavity-convexity part is enhanced. On the other hand, the user observes a microscopic structure during zoom observation while magnifying the convexity/concavity or the like that has been found, and diagnosis may be hindered if a concavity-convexity part having a size larger than that of the target concavity-convexity part is enhanced.

According to several embodiments of the invention, an image processing device includes an image acquisition section 310 that acquires a captured image, the captured image having been captured by an imaging section, and including an image of an object, a distance information acquisition section 380 that acquires distance information based on the distance from the imaging section to the object when the imaging section has captured the captured image, a known characteristic information selection section 390 that selects known characteristic information corresponding to a motion amount, and outputs the selected known characteristic information, the known characteristic information being information that indicates known characteristics relating to the structure of the object, and a concavity-convexity information extraction section 340 that extracts information that indicates a concavity-convexity part of the object that meets the characteristics specified by the selected known characteristic information from the distance information as extracted concavity-convexity information (see FIG. 1).

This configuration makes it possible to selectively detect the concavity-convexity part corresponding to the distance information. Specifically, since the distance to the object differs depending on the observation state (scene), the observation state can be specified based on the distance information, and a concavity-convexity part having the detection target size can be selectively detected corresponding to the observation state. For example, since it is considered that screening observation is performed when the distance to the object is long, or the distances to the object at a plurality of positions have a specific pattern (e.g., when the object is observed along the digestive tract), a concavity-convexity part having a size larger than a given size may be extracted. Since it is considered that zoom observation is performed when the distance to the object is short, or the distances to the object at a plurality of positions have a specific pattern (e.g., when the scope directly faces the object), a concavity-convexity part having a size smaller than the given size may be extracted.

The term "distance information" used herein refers to information (e.g., distance map) in which each position of the captured image is linked to the distance to the object at each position of the captured image. The distance information need not necessarily be used in common for a plurality of processes, and different distance information may be used for each process. For example, the distance information may include first distance information for selecting the known characteristic information, and second distance information for extracting the concavity-convexity information. A distance map or the like may be used as the second distance information since detailed information about the entire image is required to extract the concavity-convexity information. A representative distance (e.g., the average distance within a given area) that represents the distance over the entire image, a combination of the distances at a plurality of positions of the image, a distance map having a resolution lower than that of the distance map used as the second distance information, or the like may be used as the first distance information since it suffices that the observation state can be determined.

Note that the distance information is not limited to the distance from the imaging section to the object. The distance information may be arbitrary information that is acquired based on the distance from the imaging section to the object. The details of the distance information are described later.

The term "known characteristic information" used herein refers to information by which a useful structure of the surface of the object can be distinguished from an unuseful structure of the surface of the object. Specifically, the known characteristic information may be information (e.g., the size of a concavity-convexity part specific to a lesion) about a concavity-convexity part for which detection is useful (e.g., a concavity-convexity part that is useful in order to find an early lesion). In this case, an object that meets the known characteristic information is subjected to the extraction process. Alternatively, the known characteristic information may be information about a structure for which detection is not useful. In this case, an object that does not meet the known characteristic information is subjected to the extraction process. Alternatively, information about a concavity-convexity part for which detection is useful, and information about a structure for which detection is not useful, may be stored to accurately set the range of the concavity-convexity part for which detection is useful.

Although FIG. 1 illustrates an example in which the selected known characteristic information is input to the concavity-convexity information extraction section 340, the selected known characteristic information may be input to the distance information acquisition section 380. Specifically, the lower limit of the size of the concavity-convexity part included in the distance information may be changed by changing the distance information acquisition process (e.g., the resolution of the distance map) corresponding to the motion amount. In this case, since the size of the concavity-convexity part included in the distance information is reflected in the extracted concavity-convexity information, it is possible to extract a concavity-convexity part of the object that meets the characteristics specified by the selected known characteristic information.

2. First Embodiment 2.1. Endoscope Apparatus

Figure 2:
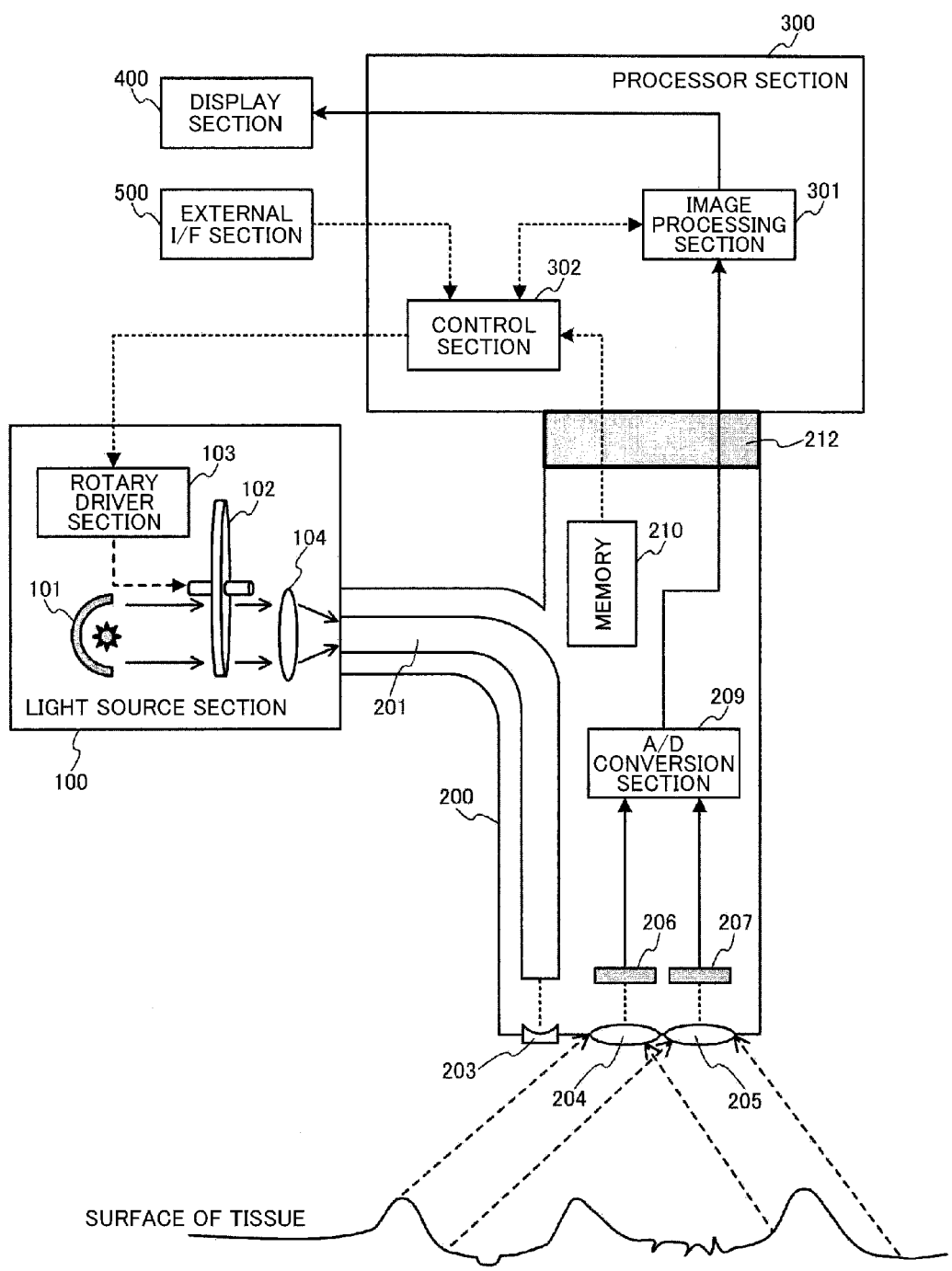
FIG. 2 illustrates a configuration example of an endoscope apparatus.

A first embodiment of the invention is described below. FIG. 2 illustrates a configuration example of an endoscope apparatus according to the first embodiment. The endoscope apparatus includes a light source section 100, an imaging section 200, a processor section 300 (control device), a display section 400, and an external I/F section 500.

The light source section 100 includes a white light source 101, a rotary color filter 102 that has a plurality of spectral transmittances, a rotary driver section 103 that drives the rotary color filter 102, and a condenser lens 104 that focuses the light that has passed through the rotary color filter 102 and has the respective spectral characteristics on the incident end face of a light guide fiber 201. The rotary color filter 102 includes three primary color filters (red filter, green filter, and blue filter) and a rotary motor.

The rotary driver section 103 rotates the rotary color filter 102 at a given rotational speed in synchronization with the imaging period of image sensors 206 and 207 included in the imaging section 200 based on a control signal output from a control section 302 included in the processor section 300. For example, when the rotary color filter 102 is rotated at 20 revolutions per second, each color filter crosses the incident white light every 1/60th of a second. In this case, the image sensors 206 and 207 capture reflected light from the observation target to which red (R), green (G), or blue (B) light is applied, and transmit the captured image to an A/D conversion section 209 every 1/60th of a second. Specifically, the endoscope apparatus according to the first embodiment frame-sequentially captures an R image, a G image, and a B image every 1/60th of a second, and the substantial frame rate is 20 fps.

Note that the method employed in the first embodiment is not limited to the frame sequential method. For example, white light from the white light source 101 may be applied to the object, and captured using an image sensor that includes an RGB Bayer color filter array.

The imaging section 200 is formed to be elongated and flexible so that the imaging section 200 can be inserted into a body cavity (e.g., stomach or large intestine). The imaging section 200 includes the light guide fiber 201 that guides the light focused by the light source section 100, and an illumination lens 203 that diffuses the light guided by the light guide fiber 201 to illuminate the observation target. The imaging section 200 also includes objective lenses 204 and 205 that focus reflected light from the observation target, the image sensors 206 and 207 that detect the focused light, and the A/D conversion section 209 that converts the photoelectrically converted analog signals output from the image sensors 206 and 207 into digital signals. The imaging section 200 further includes a memory 210 that stores scope ID information and specific information (including a production variation) about the imaging section 200, and a connector 212 for removably connecting the imaging section 200 and the processor section 300.

The image sensors 206 and 207 are single-chip monochrome image sensors when implementing the frame sequential method. For example, a CCD image sensor, a CMOS image sensor, or the like may be used as the image sensors 206 and 207. The objective lenses 204 and 205 are disposed at given intervals so that a given parallax image (hereinafter referred to as "stereo image") can be captured. The objective lenses 204 and 205 respectively form a left image and a right image on the image sensors 206 and 207. The A/D conversion section 209 converts the analog signals output from the image sensors 206 and 207 into digital signals, and outputs the digital signals (image) to the image processing section 301. The memory 210 is connected to the control section 302, and transmits the scope ID information and the specific information (including a production variation) to the control section 302.

The processor section 300 includes an image processing section 301 that performs image processing on the image transmitted from the A/D conversion section 209, and the control section 302 that controls each section of the endoscope apparatus.

The display section 400 is a display device that can display a movie (moving image), and is implemented by a CRT, a liquid crystal monitor, or the like.

The external I/F section 500 is an interface that allows the user to input information or the like to the endoscope apparatus. For example, the external I/F section 500 includes a power switch (power ON/OFF switch), a shutter button (capture start button), a mode (e.g., imaging mode) switch (e.g., a switch for selectively enhancing a concavity-convexity part of the surface of tissue), and the like. The external I/F section 500 outputs the input information to the control section 302.

2.2. Image Processing Section

Figure 3:
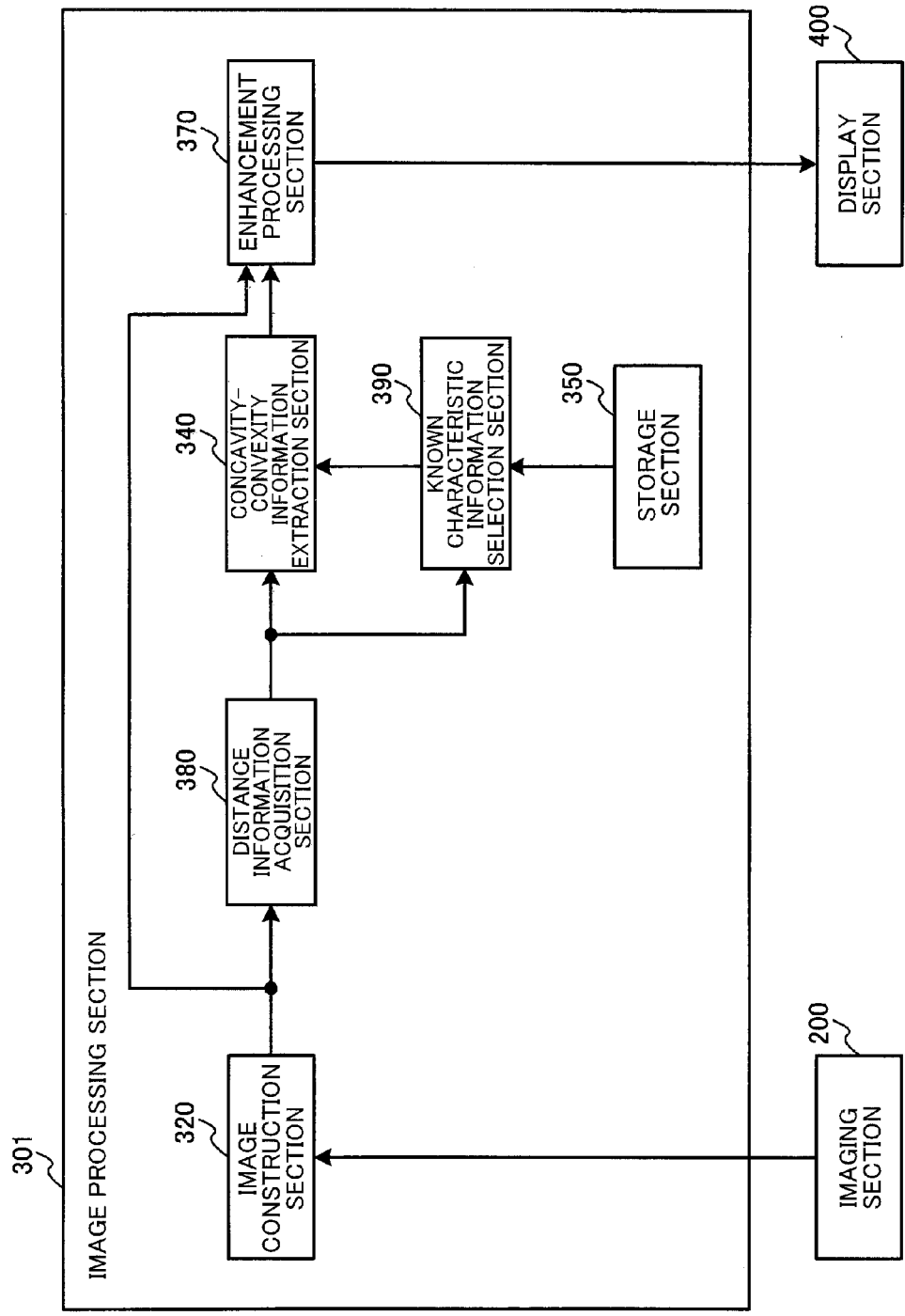
FIG. 3 illustrates a detailed configuration example of an image processing section (first embodiment).

FIG. 3 illustrates a detailed configuration example of the image processing section 301. The image processing section 301 (image processing device) includes an image construction section 320, a concavity-convexity information extraction section 340, a storage section 350, an enhancement processing section 370, a distance information acquisition section 380, and a known characteristic information selection section 390. Note that the image construction section 320 corresponds to the image acquisition section 310 illustrated in FIG. 1.

The image construction section 320 performs given image processing (e.g., OB process, gain process, and gamma process) on the image captured by the imaging section 200 to generate an image that can be output to the display section 400. The image construction section 320 outputs the generated image to the enhancement processing section 370 and the distance information acquisition section 380.

The distance information acquisition section 380 performs a stereo matching process on the stereo image captured by the stereo optical system of the imaging section 200 to acquire distance information. Specifically, the distance information acquisition section 380 performs a matching calculation process on the left image (reference image) and a local area of the right image along an epipolar line that passes through the attention pixel positioned at the center of a local area of the left image to calculate the position at which the maximum correlation is obtained as a parallax. The distance information acquisition section 380 converts the calculated parallax into the distance in the Z-axis direction to acquire the distance information, and outputs the distance information to the known characteristic information selection section 390 and the concavity-convexity information extraction section 340.

More specifically, the distance information acquisition section 380 acquires a distance map for extracting concavity-convexity information (i.e., a map in which the distance is linked to each position of the captured image), and selection distance information for selecting the known characteristic information as the distance information. The selection distance information may be generated from the distance map, or may be acquired from the stereo image separately from the distance map.

The term "distance information" refers to information that is acquired based on the distance from the imaging section 200 to the object. For example, when implementing triangulation using a stereo optical system, the distance with respect to an arbitrary point of a plane that connects two lenses that produce a parallax may be used as the distance information. Alternatively, the distance information may be acquired using a Time-of-Flight method. In this case, the imaging section 200 includes a normal optical system instead of a stereo optical system, and further includes a laser light source and a detection section that detects reflected light. A laser beam or the like is applied to the object, and the distance is measured based on the time of arrival of the reflected light. The distance with respect to the position of each pixel of the plane of the image sensor that captures the reflected light may be acquired as the distance information, for example. Although an example in which the distance measurement reference point is set to the imaging section 200 has been described above, the reference point may be set at an arbitrary position other than the imaging section 200. For example, the reference point may be set at an arbitrary position within a three-dimensional space including the imaging section 200 and the object. The distance information acquired using such a reference point is also included within the term "distance information".

The distance from the imaging section 200 to the object may be the distance from the imaging section 200 to the object in the depth direction, for example. For example, the distance in the direction of the optical axis of the imaging section 200 may be used as the distance from the imaging section 200 to the object. Specifically, the distance to a given point of the object is the distance from the imaging section 200 to the object along a line that passes through the given point and is parallel to the optical axis. Examples of such distance information include a distance map. The term "distance map" used herein refers to a map in which the distance (depth) to the object in the Z-axis direction (i.e., the direction of the optical axis of the imaging section 200) is specified for each point in the XY plane (e.g., each pixel of the captured image), for example.

The distance information acquisition section 380 may set a virtual reference point at a position that can maintain a relationship similar to the relationship between the distance values of the pixels on the distance map acquired when setting the reference point to the imaging section 200 to acquire the distance information based on the distance from the imaging section 200 to the corresponding point. For example, when the actual distances from the imaging section 200 to three corresponding points are respectively "3", "4", and "5", the distance information acquisition section 380 may acquire distance information "1.5", "2", and "2.5" respectively obtained by halving the actual distances "3", "4", and "5" while maintaining the relationship between the distance values of the pixels.

The known characteristic information selection section 390 selects the known characteristic information corresponding to the selection distance information, reads the selected known characteristic information from the storage section 350, and outputs the selected known characteristic information to the concavity-convexity information extraction section 340. The known characteristic information is the size (i.e., dimensional information (e.g., width, height, and depth)) of the detection target concavity-convexity part of tissue. Specifically, a plurality of pieces of known characteristic information are stored in the storage section 350. The plurality of pieces of known characteristic information differ in the size of the concavity-convexity part that can be extracted using each known characteristic information. The known characteristic information selection section 390 selects the known characteristic information (size) corresponding to the selection distance information from the plurality of pieces of known characteristic information.

For example, known characteristic information for screening observation (i.e., the size of the concavity-convexity part is relatively large), and known characteristic information for zoom observation (i.e., the size of the concavity-convexity part is relatively small) are stored in the storage section 350 as the plurality of pieces of known characteristic information. The global average distance within the captured image, the distance within a given representative area, or the like is acquired as the selection distance information, for example. The known characteristic information selection section 390 determines that screening observation is performed when the selection distance information is larger than a threshold value, and selects the known characteristic information for screening observation. The known characteristic information selection section 390 determines that zoom observation is performed when the selection distance information is smaller than the threshold value, and selects the known characteristic information for zoom observation.

The distances at a plurality of positions (e.g., the distance within the center area of the captured image, and the distance within the peripheral area (e.g., an area around each corner) of the captured image) may be acquired as the selection distance information. Since the scope is normally inserted along the digestive tract during screening observation, the deep area of the digestive tract is captured in the center area of the image, and the wall of the digestive tract is captured in the peripheral area of the image. Therefore, the distance within the peripheral area of the image is shorter than the distance within the center area of the image. Since the scope directly faces the object during zoom observation, the distance is short over the entire image. The known characteristic information selection section 390 may determine whether screening observation or zoom observation is performed by detecting such a distance pattern to select the known characteristic information.

The concavity-convexity information extraction section 340 extracts the concavity-convexity information that indicates the concavity-convexity part of the surface of tissue from the distance information (distance map) based on the selected known characteristic information, and outputs the extracted concavity-convexity information to the enhancement processing section 370. The known characteristic information specifies a concavity-convexity structure (e.g., the concavity-convexity structure having a size equal to that of a lesion or the like to which the user pays attention) that is smaller than the global concavity-convexity structure that depends on the shape (e.g., lumen or folds) of the digestive tract. Specifically, the concavity-convexity information extraction section 340 extracts the desired concavity-convexity part excluding the global concavity-convexity structure. Since the known characteristic information is selected corresponding to the distance information (selection distance information), the size of the concavity-convexity part to be extracted increases when the distance indicated by the distance information is long (i.e., during screening observation), and decreases when the distance indicated by the distance information is short (i.e., during zoom observation). The details of the concavity-convexity information extraction section 340 are described later.

The enhancement processing section 370 performs an enhancement process on the captured image based on the extracted concavity-convexity information, and outputs the resulting image to the display section 400 as a display image. For example, the enhancement processing section 370 performs a process that blues the area of the captured image that corresponds to each concavity indicated by the extracted concavity-convexity information. This makes it possible to enhance the concavities and convexities on the surface of tissue without spraying a dye. Note that the enhancement process is not limited to the above process. For example, the enhancement processing section 370 may perform a process that causes the color to differ between a concavity and a convexity.

Although an example in which the distance information is acquired using a stereo imaging method or a Time-of-flight method has been described above, the first embodiment is not limited thereto. For example, a defocus parameter may be calculated from the captured image, and the distance information may be acquired based on the defocus parameter. In this case, the imaging section 200 includes a normal optical system instead of a stereo optical system, and further includes a focus lens driver section. The distance information acquisition section 380 may acquire a first image and a second image while shifting the focus lens position, convert each image into brightness values, calculate a second derivative of the brightness values of each image, and calculate the average value thereof. The distance information acquisition section 380 may calculate the difference between the brightness value of the first image and the brightness value of the second image, divide the difference by the average second derivative value, calculate the defocus parameter, and acquire the distance information from the relationship between the defocus parameter and the object distance (e.g., stored in a look-up table).

2.3. Concavity-Convexity Information Extraction Section

Figure 4:
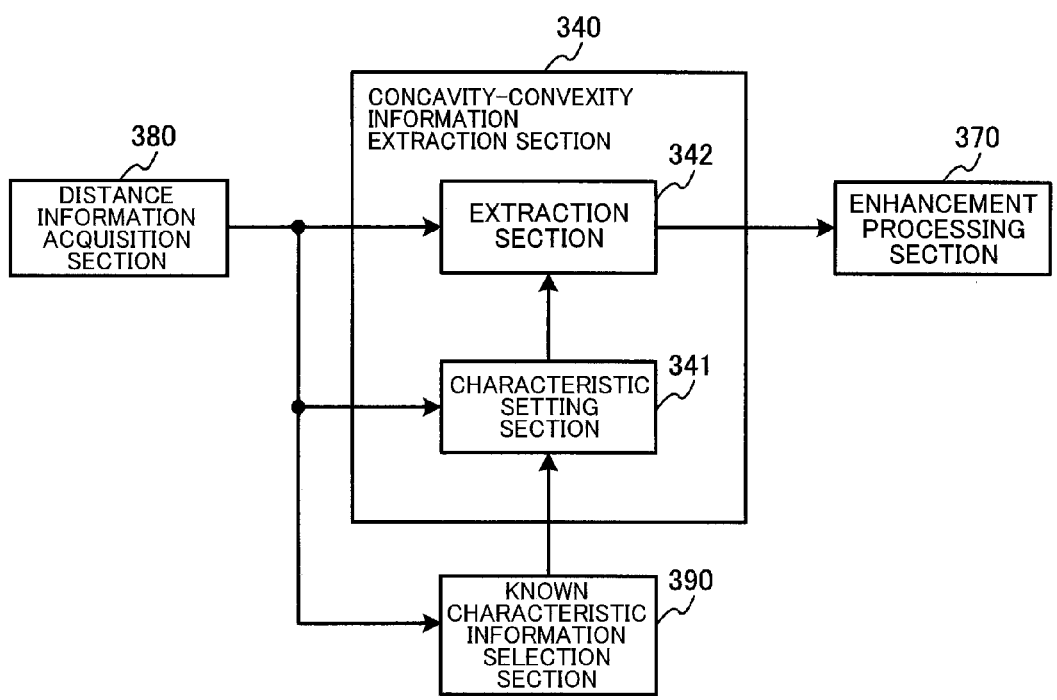
FIG. 4 illustrates a detailed configuration example of a concavity-convexity information extraction section (first embodiment).

FIG. 4 illustrates a detailed configuration example of the concavity-convexity information extraction section 340. The concavity-convexity information extraction section 340 includes a characteristic setting section 341 and an extraction section 342.

Figure 5A:
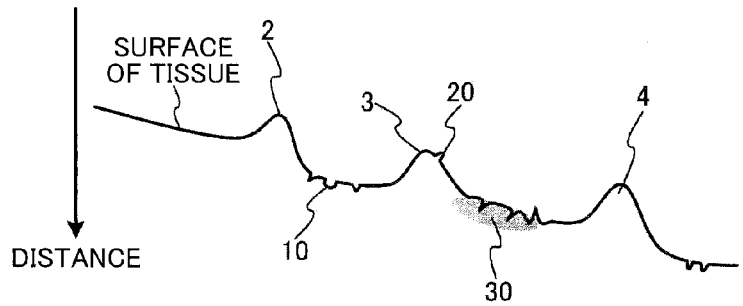
FIGS. 5A to 5D are views illustrating a concavity-convexity information extraction process.

FIG. 5A schematically illustrates an example of the distance map. FIG. 5A illustrates an example in which the distance map is a one-dimensional distance map for convenience of explanation. In FIG. 5A, the axis indicated by the arrow indicates the distance. The distance map includes information about an approximate structure of tissue (e.g., shape information about a lumen and folds 2, 3, and 4), and information about the concavity-convexity part (e.g., concavities 10 and 30 and a convexity 20) on the surface of tissue.

Figure 5B:
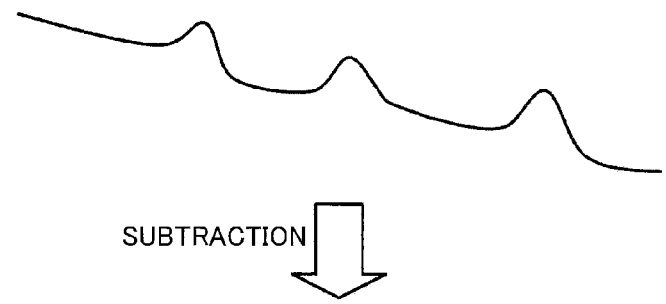

The known characteristic information selection section 390 acquires the dimensional information (i.e., information about the size of the extraction target concavity-convexity part of tissue) from the storage section 350 as the known characteristic information. The characteristic setting section 341 determines the frequency characteristics of a low-pass filtering process based on the dimensional information. As illustrated in FIG. 5B, the extraction section 342 performs the low-pass filtering process on the distance map using the determined frequency characteristics to extract the information about an approximate structure of tissue (shape information about a lumen, folds, and the like).

Figure 5C:

As illustrated in FIG. 5C, the extraction section 342 subtracts the information about an approximate structure of tissue from the distance map to generate a concavity-convexity map that is the concavity-convexity information about the surface area of tissue (i.e., information about a concavity-convexity part having the desired size). For example, the horizontal direction of the image, the distance map, and the concavity-convexity map is defined as an x-axis, and the vertical direction of the image, the distance map, and the concavity-convexity map is defined as a y-axis. The distance at the coordinates (x, y) of the distance map is defined as dist(x, y), and the distance at the coordinates (x, y) of the distance map after the low-pass filtering process is defined as dist_LPF(x, y). In this case, the concavity-convexity information diff(x, y) at the coordinates (x, y) of the concavity-convexity map is calculated by the following expression (1).

$$\mathrm{diff}(x,y)=\mathrm{dist}(x,y)-\mathrm{dist\_LPF}(x,y) \quad (1)$$

A process that determines the cut-off frequency (extraction process parameter in a broad sense) from the dimensional information is described in detail below.

Figure 5D:
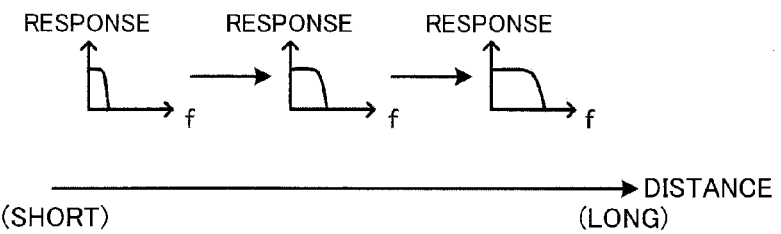

The characteristic setting section 341 performs the low-pass filtering process using a given size (e.g., N×N pixels (N is a natural number equal to or larger than 2)) on the input distance information. The characteristic setting section 341 adaptively determines the extraction process parameter based on the resulting distance information (local average distance). Specifically, the characteristic setting section 341 determines the characteristics of the low-pass filtering process that smooth the extraction target concavity-convexity part of tissue due to a lesion while maintaining the structure of the lumen and the folds specific to the observation target part. Since the characteristics of the extraction target (i.e., concavity-convexity part) and the exclusion target (i.e., folds and lumen) can be determined from the known characteristic information, the spatial frequency characteristics are known, and the characteristics of the low-pass filter can be determined. Since the apparent size of the structure changes corresponding to the local average distance, the characteristics of the low-pass filter are determined corresponding to the local average distance (see FIG. 5D).

Since the known characteristic information is selected corresponding to the selection distance information, the characteristics of the low-pass filter change corresponding to the known characteristic information. Specifically, the cut-off frequency of the low-pass filter is decreased when screening observation is performed since the size indicated by the known characteristic information is large, and is increased when zoom observation is performed since the size indicated by the known characteristic information is small. That is, the cut-off frequency during screening observation is lower than that during zoom observation (i.e., a concavity-convexity part having a larger size is extracted) when the distance is identical (see FIG. 5D).

The low-pass filtering process may be implemented by a Gaussian filter represented by the following expression (2) or a bilateral filter represented by the following expression (3), for example. Note that x is the pixel position of the distance map, x0 is the current processing target pixel position, and p(x) is the distance at the pixel position x.

$$f(x) = \frac{1}{N}\exp\left(-\frac{(x-x0)^2}{2\sigma^2}\right) \quad (2)$$

$$f(x) = \frac{1}{N}\exp\left(-\frac{(x-x0)^2}{2\sigma_c^2}\right) \times \exp\left(-\frac{(p(x)-p(x0))^2}{2\sigma_v^2}\right) \quad (3)$$

The frequency characteristics of these filters are controlled using $\sigma$, $\sigma_c$, and $\sigma_v$. A $\sigma$ map that respectively corresponds to each pixel of the distance map may be generated as the extraction process parameter. When using the bilateral filter, a $\sigma_c$ map and/or a $\sigma_v$ map may be generated as the extraction process parameter.

For example, $\sigma$ may be a value that is larger than a value obtained by multiplying the pixel-to-pixel distance D1 of the distance map corresponding to the size of the extraction target concavity-convexity part by $\alpha$ ($>1$), and is smaller than a value obtained by multiplying the pixel-to-pixel distance D2 of the distance map corresponding to the size of the lumen and the folds specific to the observation target part by $\beta$ ($<1$). For example, $\sigma$ may calculated by $\sigma=(\alpha*D1+\beta*D2)/2*R\sigma$. Note that $R\sigma$ is a function of the local average distance. The value $R\sigma$ increases as the local average distance decreases, and decreases as the local average distance increases.

The known characteristic information selection section 390 may read the dimensional information corresponding to the observation target part from the storage section 350, and the concavity-convexity information extraction section 340 may specify the target corresponding to the observation target part based on the dimensional information, for example. The observation target part may be determined using the scope ID stored in the memory 210 (see FIG. 2), for example. For example, when the scope is an upper gastrointestinal scope, the dimensional information corresponding to the gullet, the stomach, and the duodenum (i.e., observation target part) is read from the storage section 350. When the scope is a lower gastrointestinal scope, the dimensional information corresponding to the large intestine (i.e., observation target part) is read from the storage section 350.

Note that the first embodiment is not limited to the extraction process that utilizes the low-pass filtering process. For example, the extracted concavity-convexity information may be acquired using a morphological process, a high-pass filtering process, or a band-pass filtering process.

Figure 6A:
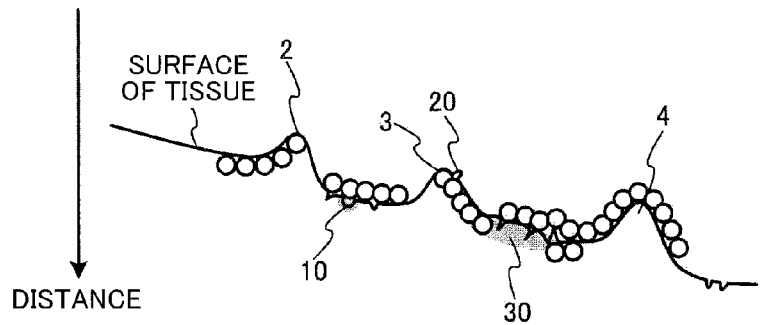
FIGS. 6A to 6F are views illustrating a concavity-convexity information extraction process.
Figure 6B:
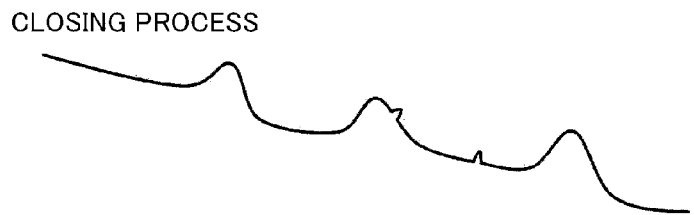
Figure 6C:
Figure 6D:
Figure 6E:
Figure 6F:
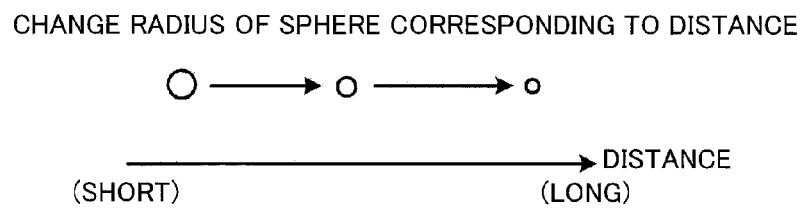

When using the morphological process, an opening process and a closing process using a given kernel size (i.e., the size (sphere diameter) of the structural element) are performed on the distance map (see FIG. 6A). The extraction process parameter is the size of the structural element. For example, when using a sphere as the structural element, the diameter of the sphere is set to be smaller than the size of the lumen and the folds of the observation target part based on observation target part information, and larger than the size of the extraction target concavity-convexity part of tissue due to a lesion. As illustrated in FIG. 6F, the diameter of the sphere is increased as the local average distance decreases, and is decreased as the local average distance increases. As illustrated in FIGS. 6B and 6C, the concavities on the surface of tissue are extracted by calculating the difference between information obtained by the closing process and the original distance information. As illustrated in FIGS. 6D and 6E, the convexities on the surface of tissue are extracted by calculating the difference between information obtained by the opening process and the original distance information.

The morphological process sets the diameter of the sphere based on the known characteristic information (dimensional information) selected corresponding to the selection distance information. Specifically, the diameter of the sphere during screening observation is set to be larger than that during zoom observation when the distance is identical (see FIG. 6F). A concavity-convexity part having a larger size is extracted during screening observation.

When using the high-pass filtering process or the band-pass filtering process, the cut-off frequency of the high-pass filtering process, or the passband of the band-pass filtering process are set based on the known characteristic information (dimensional information) selected corresponding to the selection distance information. In this case, the frequency characteristics may be set so that a concavity-convexity part having a larger size is extracted during screening observation.

2.4. Software

Although the first embodiment has been described above taking an example in which each section of the image processing device (image processing section 301) is implemented by hardware, the configuration of the first embodiment is not limited thereto. For example, a CPU may perform the process of each section on an image acquired using an imaging device and the distance information. Specifically, the process of each section may be implemented by software by causing the CPU to execute a program. Alternatively, part of the process of each section may be implemented by software.

In this case, a program stored in an information storage device is read, and executed by a processor (e.g., CPU). The information storage device (computer-readable device) stores a program, data, and the like. The information storage device may be an arbitrary recording device that records a program that can be read by a computer system, such as a portable physical device (e.g., CD-ROM, USB memory, MO disk, DVD disk, flexible disk (FD), magnetooptical disk, or IC card), a stationary physical device (e.g., HDD, RAM, or ROM) that is provided inside or outside a computer system, or a communication device that temporarily stores a program during transmission (e.g., public line connected through a modem, or a local area network or a wide area network to which another computer system or a server is connected).

Specifically, a program is recorded on the recording device so that the program can be read by a computer. A computer system (i.e., a device that includes an operation section, a processing section, a storage section, and an output section) implements an image processing device by reading the program from the recording device, and executing the program. Note that the program need not necessarily be executed by a computer system. The invention may similarly be applied to the case where another computer system or a server executes the program, or another computer system and a server execute the program in cooperation. Note that an image processing method (i.e., a method for operating or controlling an image processing device) may be implemented by an image processing device (hardware), or may be implemented by causing a CPU or the like to execute a program that describes the process of the image processing method.

Figure 7:
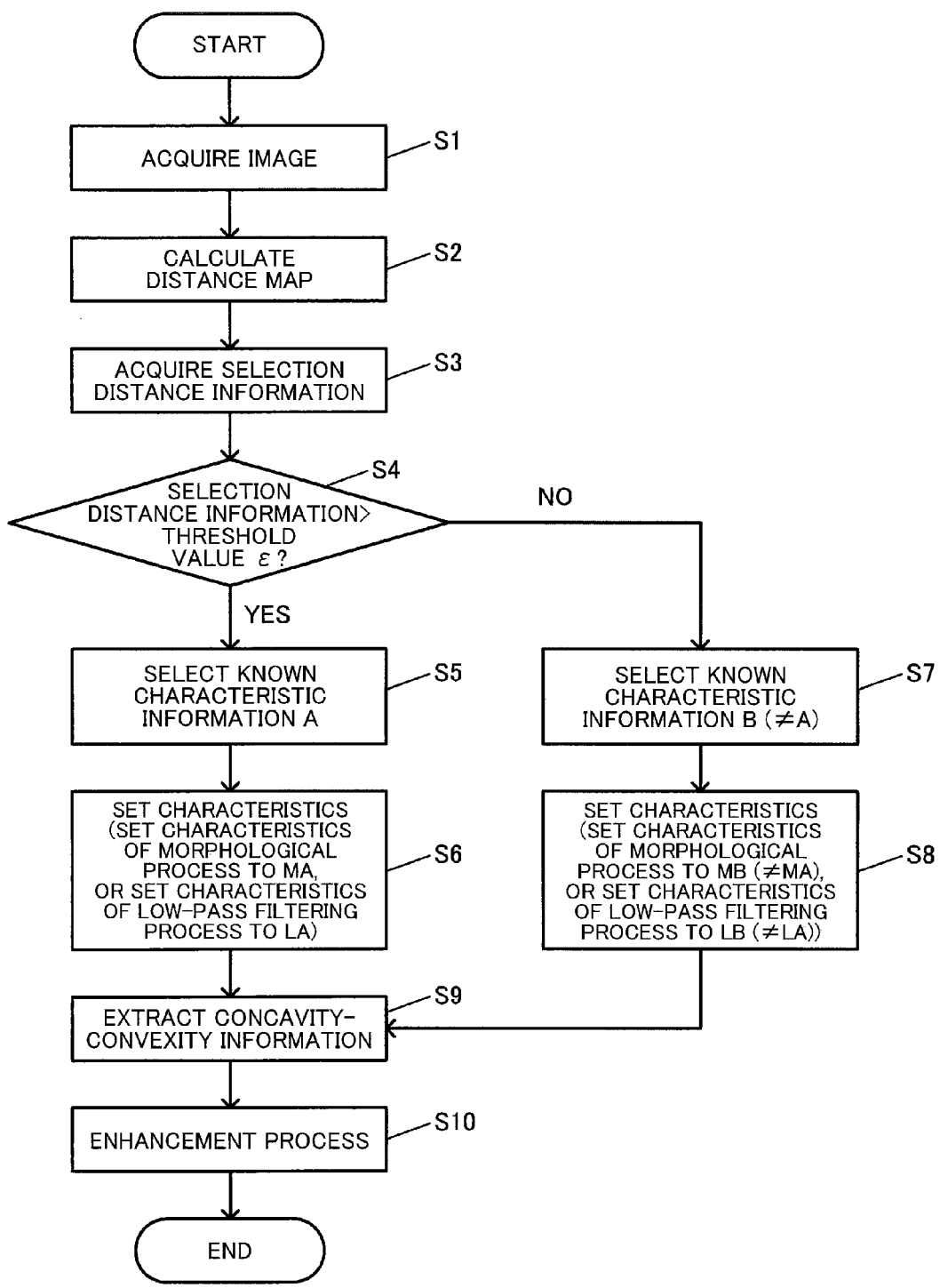
FIG. 7 is a flowchart of image processing (first embodiment).

FIG. 7 is a flowchart when the process performed by the image processing section 301 is implemented by software.

In a step S1, the captured image (stereo image) is acquired (e.g., read from a memory (not illustrated in the drawings)). The stereo matching process is performed to acquire the distance map (step S2). The selection distance information is acquired from the distance map (step S3).

Whether or not the distance indicated by the selection distance information is larger than the threshold value $\epsilon$ (e.g., given threshold value) is determined (step S4). When the distance indicated by the selection distance information is larger than the threshold value $\epsilon$, known characteristic information A corresponding to screening observation is selected (step S5), and the characteristics of the concavity-convexity extraction process are set based on the known characteristic information A (step S6). Specifically, the characteristics (e.g., the diameter of a sphere) of the morphological process are set to MA based on the known characteristic information A, or the characteristics (e.g., cut-off frequency) of the low-pass filtering process are set to LA based on the known characteristic information A. When the distance indicated by the selection distance information is equal to or smaller than the threshold value $\epsilon$, known characteristic information B ($\neq$A) corresponding to zoom observation is selected (step S7), and the characteristics of the concavity-convexity extraction process are set based on the known characteristic information B (step S8). For example, the characteristics of the morphological process are set to MB ($\neq$MA) based on the known characteristic information B, or the characteristics of the low-pass filtering process are set to LB ($\neq$LA) based on the known characteristic information B.

The concavity-convexity information is extracted based on the characteristics set in the step S6 or S8 (step S9). The enhancement process is performed on the captured image based on the extracted concavity-convexity information (step S10) to complete the process.

Although the first embodiment has been described above taking an example in which an identical concavity-convexity extraction process (e.g., low-pass filtering process) is performed during screening observation and zoom observation, the first embodiment is not limited thereto. For example, a different concavity-convexity extraction process may be performed corresponding to the observation state, and the characteristics corresponding thereto may be set based on the selected known characteristic information. Specifically, the concavity-convexity detection process may be performed in an arbitrary manner as long as a concavity-convexity part having a larger size is extracted during screening observation.

According to the first embodiment, the known characteristic information is information corresponding to the size relating to the structure of the object. The known characteristic information selection section 390 selects the known characteristic information that corresponds to a different size corresponding to the distance information.

According to this configuration, since the known characteristic information that corresponds to an appropriate size can be selected corresponding to the observation state, it is possible to extract (detect) a concavity-convexity part having an appropriate size corresponding to the observation state, and present the concavity-convexity part to the user through the enhancement process or the like.

Note that the information corresponding to the size relating to the structure of the object is information corresponding to the size of the detection target concavity-convexity part (e.g., dimensional information). For example, when the detection target concavity-convexity part is a specific lesion, the information corresponding to the size relating to the structure of the object is the width, the height, the depth, and the like of a concavity-convexity structure (e.g., groove (concavity), convexity, or blood vessel course) that is characteristic to the lesion.

The known characteristic information selection section 390 may select the known characteristic information that corresponds to a first size when the distance information is larger than a threshold value, and select the known characteristic information that corresponds to a second size that is smaller than the first size when the distance information is smaller than the threshold value.

This configuration makes it possible to select known characteristic information appropriate for each observation state corresponding to the distance when the observation state can be determined based on the distance. For example, it is possible to determine whether the observation state is the screening observation state in which the entire object is observed while moving the scope, and the distance from the scope to the object is long, or the zoom observation state in which the object is closely observed, and the scope is brought close to the object.

Note that the observation state may be determined from three or more observation states instead of two observation states. For example, when determining whether or not the distance information is larger than a threshold value, the known characteristic information may be selected using a threshold value for determining whether the observation state is a first observation state or a second observation state, and a threshold value for determining whether the observation state is the second observation state or a third observation state.

Note that the known characteristic information need not necessarily be selected using a threshold value. For example, the known characteristic information selection section 390 may determine whether the observation state is the screening observation state or the zoom observation state based on the distance information, and select the known characteristic information corresponding to the determined observation state. For example, the known characteristic information selection section 390 may select the known characteristic information using the distance information pattern at a plurality of positions of the captured image.

The concavity-convexity information extraction section 340 may determine the extraction process parameter based on the selected known characteristic information that has been selected corresponding to the distance information, and extract the extracted concavity-convexity information based on the determined extraction process parameter.

According to this configuration, it is possible to extract information that indicates the concavity-convexity part of the object that meets the characteristics specified by the known characteristic information selected corresponding to the distance information. Specifically, since the extraction process parameter is determined corresponding to the distance information, a concavity-convexity part having a size corresponding to the distance information can be extracted by performing the concavity-convexity extraction process based on the extraction process parameter.

Note that the known characteristic information may be selected based on the distance information and additional information, and the extraction process parameter may be determined based on the selected known characteristic information (described later). For example, the known characteristic information may be selected using characteristic information (e.g., scope ID) about the endoscope apparatus, and/or observation information (e.g., observation target part or observation target disease). In this case, the extraction target concavity-convexity part having a size corresponding to the distance information can be changed corresponding to the characteristic information about the endoscope apparatus, and/or the observation information.

The extraction process parameter is a parameter that determines the characteristics of the concavity-convexity extraction process. The extraction process parameter is set so that a concavity-convexity part that meets the known characteristic information is extracted. For example, when extracting the concavity-convexity part using the morphological process (opening process and closing process), the size of the structural element (e.g., sphere diameter) corresponds to the extraction process parameter. In this case, the size of the structural element is set between the size of the desired concavity-convexity structure indicated by the known characteristic information and the size of a concavity-convexity structure that it is not desired to extract. When extracting the concavity-convexity part using the low-pass filtering process, the frequency characteristics of the low-pass filtering process correspond to the extraction process parameter. In this case, the frequency characteristics are set so that the size of the desired concavity-convexity structure indicated by the known characteristic information does not pass through, and the size of a concavity-convexity structure that it is not desired to extract passes through.

2.5. Modification

Figure 15:
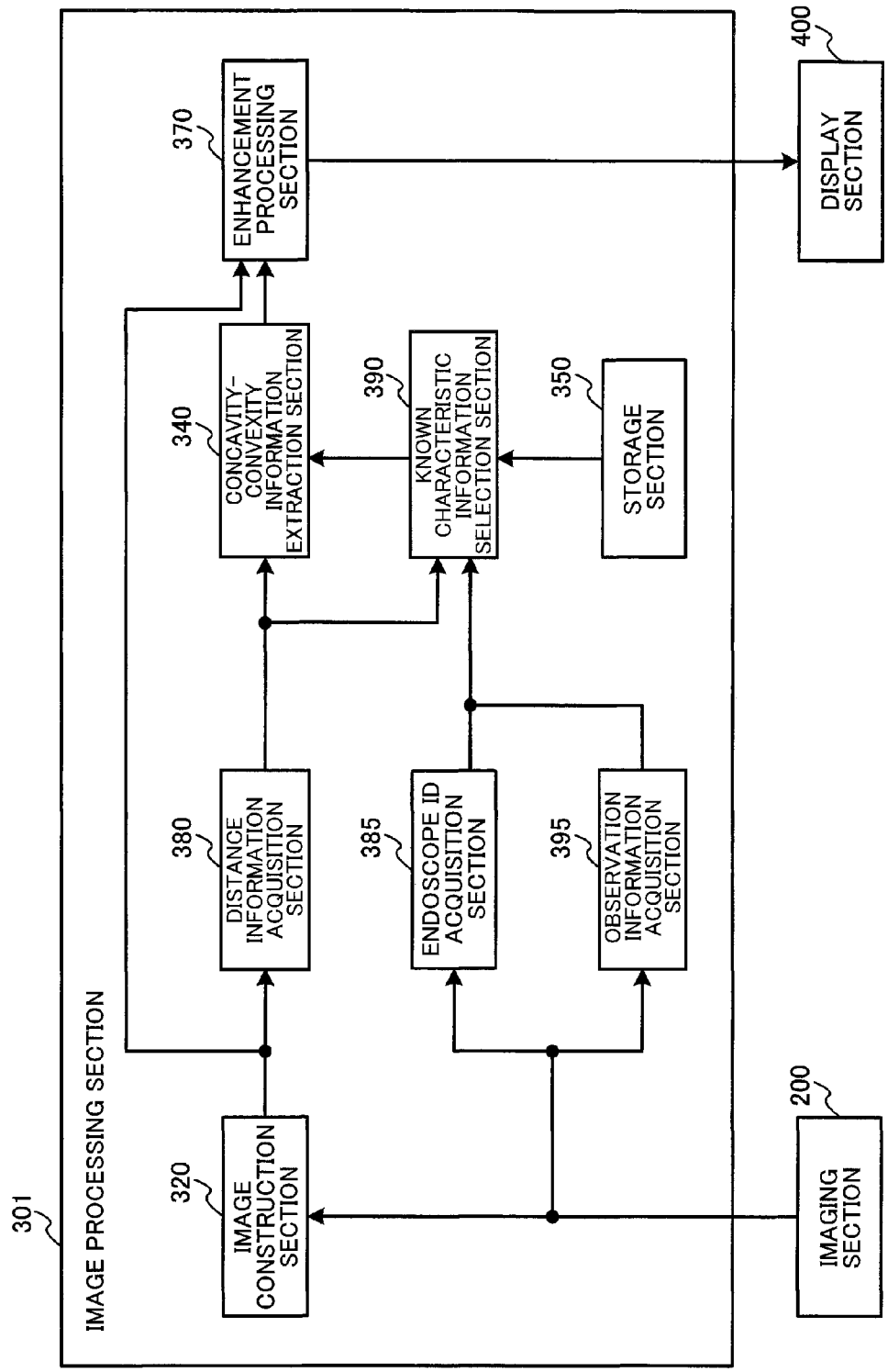
FIG. 15 illustrates a configuration example of an image processing device (modification).

FIG. 15 illustrates a configuration example of an image processing section 301 according to a modification. According to the modification, the known characteristic information is selected based on the distance information, the characteristic information about the endoscope apparatus, and the observation information. Although an example in which the modification is applied to the first embodiment is described below, the modification may also be applied to a second embodiment, a third embodiment, and a fourth embodiment described later.

The image processing section 301 illustrated in FIG. 15 includes an image construction section 320, a concavity-convexity information extraction section 340, a storage section 350, an enhancement processing section 370, a distance information acquisition section 380, an endoscope ID acquisition section 385, a known characteristic information selection section 390, and an observation information acquisition section 395. Note that the same elements as those described above are respectively indicated by the same reference signs, and description thereof is appropriately omitted.

The endoscope ID acquisition section 385 acquires an ID (scope ID or endoscope ID) that specifies the imaging section 200 from the memory 210 included in the imaging section 200. The imaging section 200 can be exchanged corresponding to the application or the like, and an ID corresponding to the attached imaging section 200 is stored in the memory 210 (see FIG. 2).

The observation information acquisition section 395 acquires information about the observation target part (e.g., gullet, stomach, or large intestine), and information about the observation target symptom (e.g., the type of disease, the type of lesion, or the stage of progression) as the observation information. The user may select the observation information from a part/symptom selection menu displayed on the display section 400, or the observation information may be acquired by a part/symptom determination process implemented by image processing, for example.

The known characteristic information selection section 390 selects the known characteristic information based on the distance information, the endoscope ID, and the observation information. For example, the known characteristic information selection section 390 determines the number of pixels and the pixel size of the image sensor based on the endoscope ID. Since the distance to the object corresponding to one pixel differs depending on the number of pixels and the pixel size, the size (number of pixels) within the image differs even if the size within the object is identical. Therefore, the known characteristic information is selected (determined) corresponding to the size within the image. Since it is considered that the size of the observation target differs depending on the observation information (observation target part (type of internal organ) and observation target symptom), the known characteristic information is selected (determined) corresponding to the observation target part and the observation target symptom.

Figure 16:
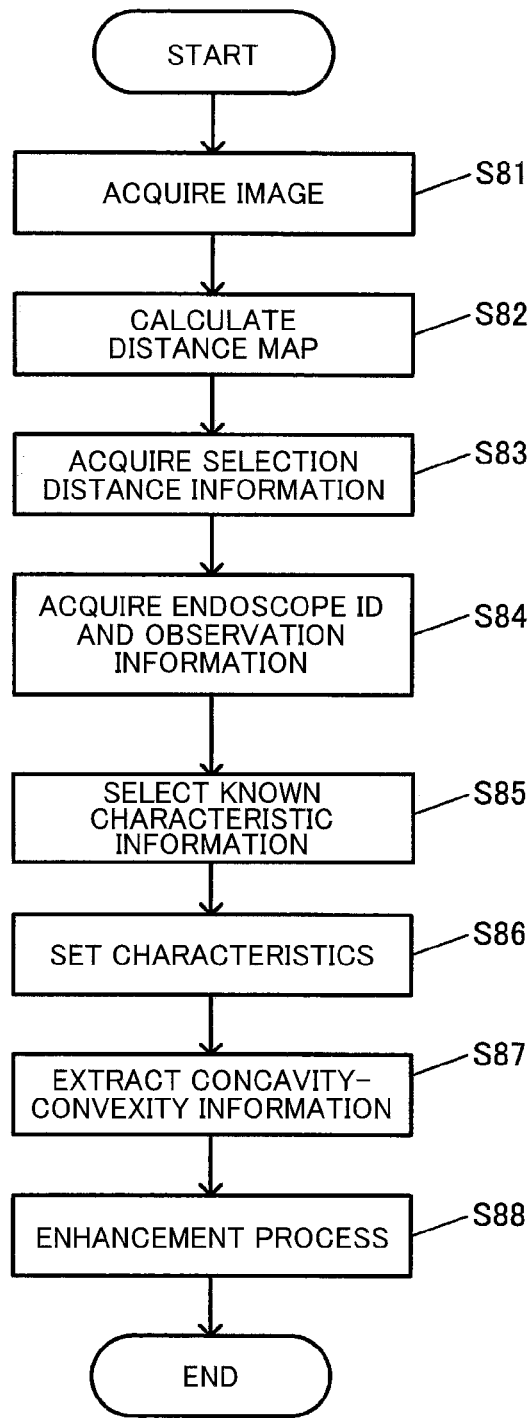
FIG. 16 is a flowchart of image processing (modification).

FIG. 16 is a flowchart when the process performed by the image processing section 301 is implemented by software. Note that steps S81 to S83, S87, and S88 illustrated in FIG. 16 are the same as the steps S1 to S3, S9, and S10 illustrated in FIG. 7, and description thereof is omitted.

In a step S84, the endoscope ID and the observation information are acquired. The known characteristic information is selected based on the selection distance information, the endoscope ID, and the observation information (step S85). For example, a plurality of sets of known characteristic information are stored in the storage section 350 corresponding to the endoscope ID and the observation information. Each set includes the known characteristic information corresponding to the selection distance information. A set that corresponds to the endoscope ID and the observation information acquired in the step S84 is read from the storage section 350, and the known characteristic information corresponding to the selection distance information (i.e., observation state) acquired in the step S85 is acquired from the set. The characteristics of the morphological process are set based on the selected known characteristic information (step S86).

3. Second Embodiment 3.1. Image Processing Section

Figure 11:
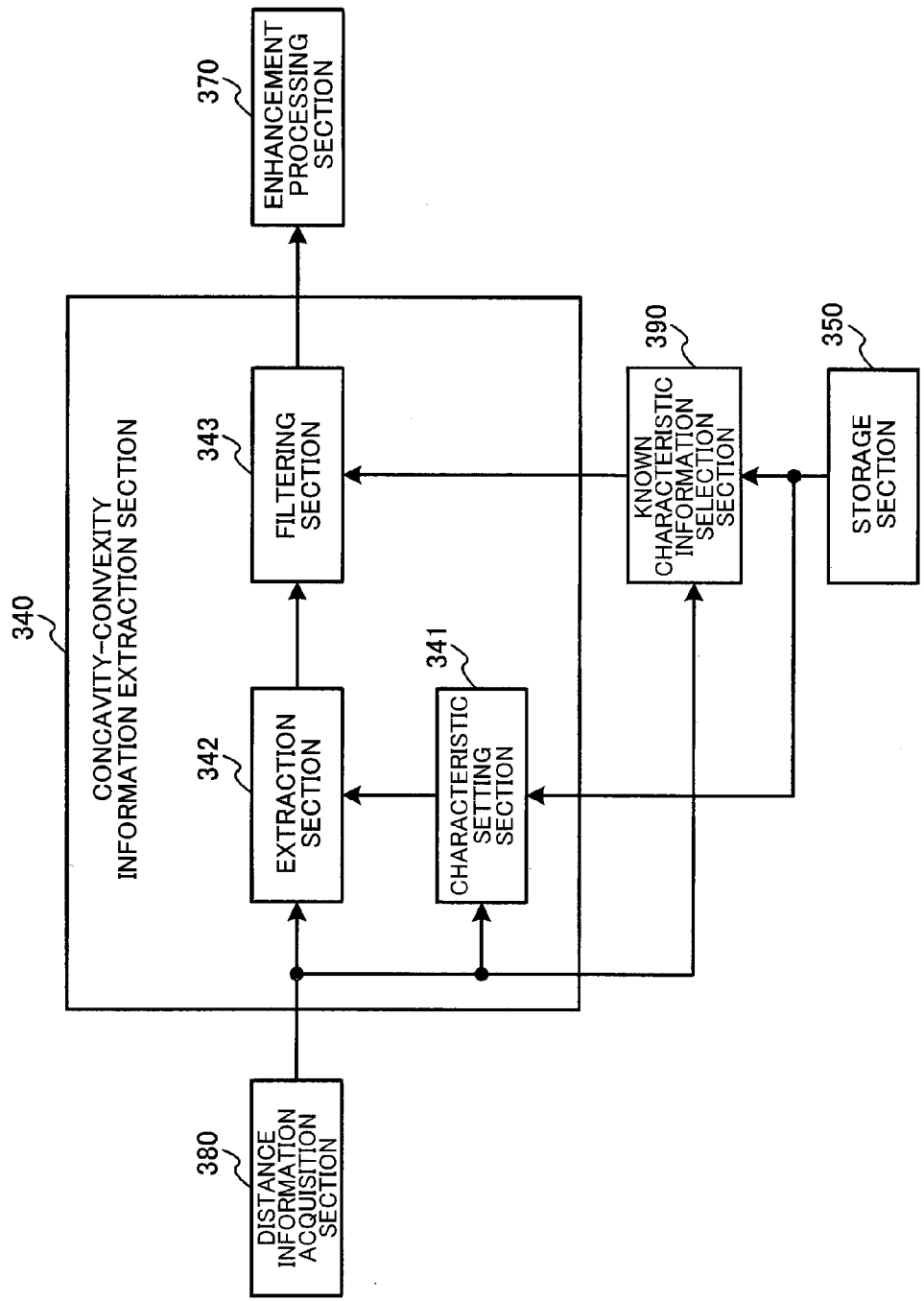
FIG. 11 illustrates a detailed configuration example of a concavity-convexity information extraction section (second embodiment).

FIG. 11 illustrates a detailed configuration example of a concavity-convexity information extraction section 340 according to a second embodiment of the invention. The concavity-convexity information extraction section 340 illustrated in FIG. 11 includes a characteristic setting section 341, an extraction section 342, and a filtering section 343. Note that the same elements as those described above in connection with the first embodiment are respectively indicated by the same reference signs, and description thereof is appropriately omitted. For example, the endoscope apparatus and the image processing section 301 may be configured in the same manner as in the first embodiment.

The characteristic setting section 341 acquires identical known characteristic information from the storage section 350 independently of the selection distance information, and sets the characteristics of the concavity-convexity extraction process based on the known characteristic information. The extraction section 342 performs the concavity-convexity extraction process using the characteristics set by the characteristic setting section 341. The details of the concavity-convexity extraction process are the same as described above in connection with the first embodiment. Since identical known characteristic information is used in this stage independently of the distance information, identical concavity-convexity information is detected independently of the distance information.

The filtering section 343 performs a filtering process on the extracted concavity-convexity information (see FIG. 5C, or FIGS. 6C and 6E, for example). A low-pass filtering process, a high-pass filtering process, or the like may be used as the filtering process. The frequency characteristics of the filtering process are determined based on the known characteristic information selected by the known characteristic information selection section 390. Specifically, the characteristics of the filtering process are determined so that a lower frequency is passed during screening observation (i.e., a larger concavity-convexity part is detected during screening observation). The filtering section 343 outputs the resulting concavity-convexity information to the enhancement processing section 370 as the extracted concavity-convexity information.

3.2. Software

Figure 12:
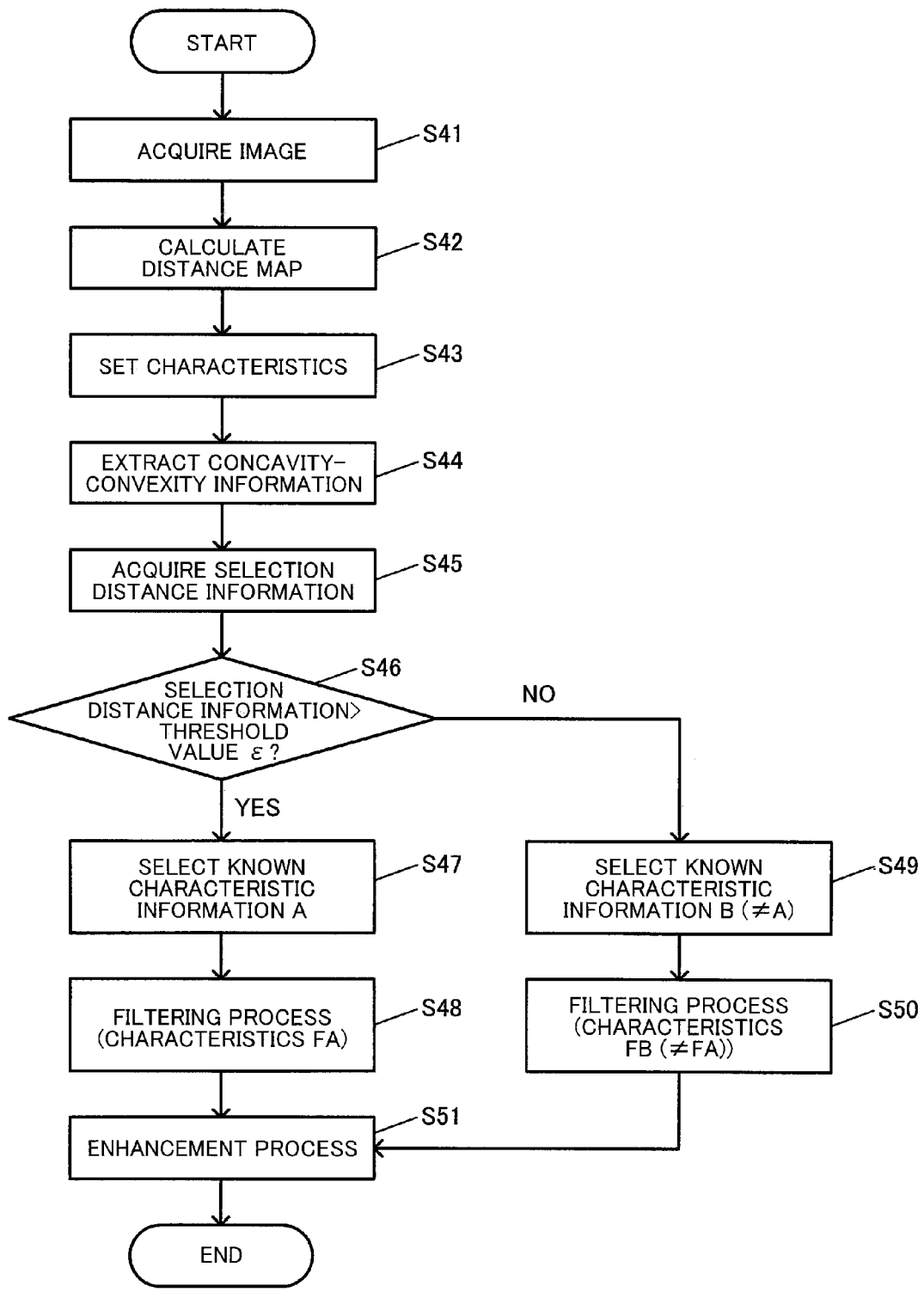
FIG. 12 is a flowchart of image processing (second embodiment).

FIG. 12 is a flowchart when the process performed by the image processing section 301 is implemented by software.

In a step S41, the captured image (stereo image) is acquired. The stereo matching process is performed to acquire the distance map (step S42). The characteristics of the concavity-convexity extraction process are set based on the known characteristic information (step S43), and the concavity-convexity information is extracted from the distance map using the characteristics set in the step S43 (step S44). The selection distance information is acquired from the distance map (step S45).

Whether or not the selection distance information is larger than the threshold value $\epsilon$ is determined (step S46). When the selection distance information is larger than the threshold value $\epsilon$, known characteristic information A corresponding to screening observation is selected (step S47), and a filtering process using characteristics FA (e.g., cut-off frequency) corresponding to the known characteristic information A is performed on the concavity-convexity information extracted in the step S44 (step S48). When the selection distance information is equal to or smaller than the threshold value $\epsilon$, known characteristic information B ($\neq$A) corresponding to zoom observation is selected (step S49), and a filtering process using characteristics FB ($\neq$FA) corresponding to the known characteristic information B is performed on the concavity-convexity information extracted in the step S44 (step S50).

The enhancement process is performed on the captured image based on the concavity-convexity information subjected to the filtering process in the step S48 or S50 (step S51) to complete the process.

According to the second embodiment, the concavity-convexity information extraction section 340 extracts information that indicates the concavity-convexity part of the object that meets the characteristics specified by the known characteristic information from the distance information. The concavity-convexity information extraction section 340 performs the filtering process on the extracted information using the frequency characteristics based on the known characteristic information selected corresponding to the distance information to extract the extracted concavity-convexity information.

According to this configuration, it is possible to extract the concavity-convexity information corresponding to the observation state by performing the filtering process using frequency characteristics corresponding to the distance information on the concavity-convexity information extracted independently of the observation state. The concavity-convexity part can be adaptively detected corresponding to the observation state in the same manner as in the first embodiment by utilizing the above method.

4. Third Embodiment 4.1. Image Processing Section

Figure 8:
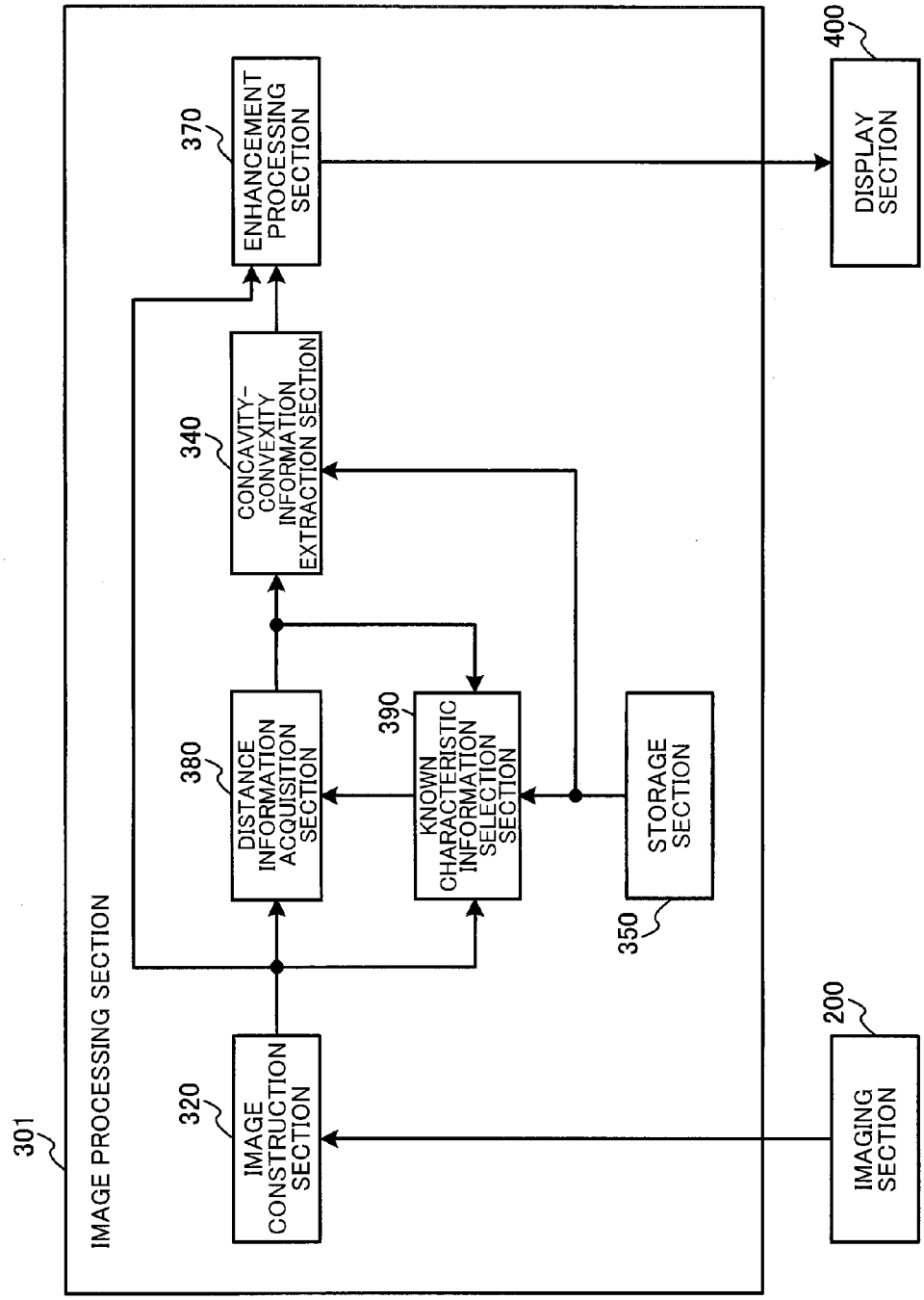
FIG. 8 illustrates a detailed configuration example of an image processing section (third embodiment).
Figure 9:
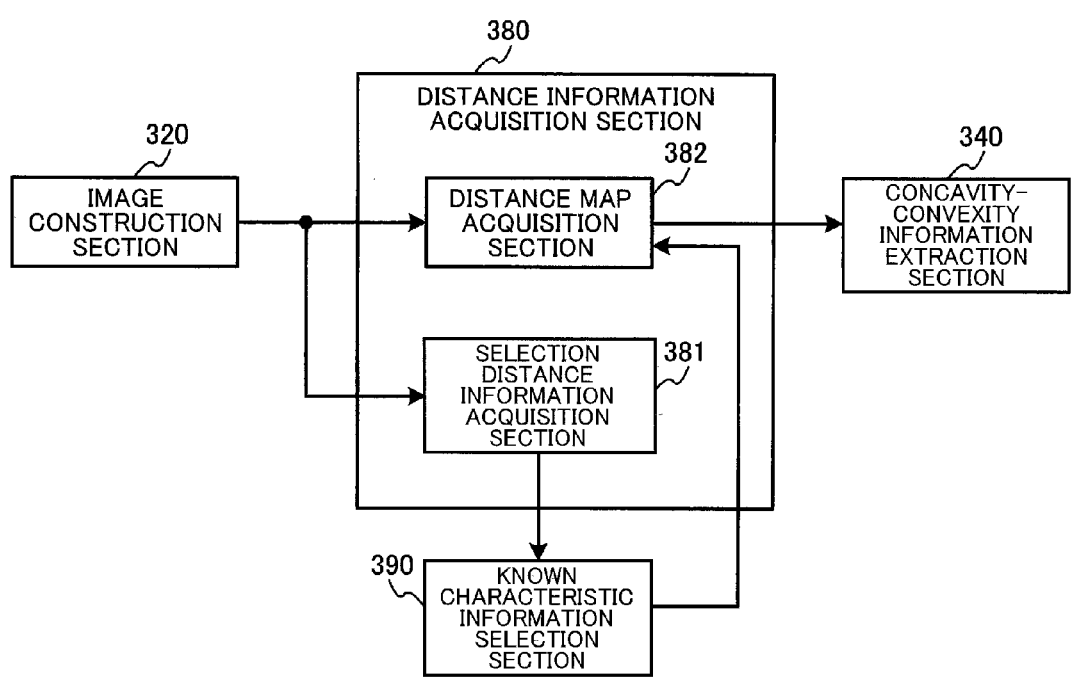
FIG. 9 illustrates a detailed configuration example of a distance information acquisition section (third embodiment).

FIG. 8 illustrates a detailed configuration example of an image processing section 301 according to a third embodiment of the invention. The image processing section 301 illustrated in FIG. 8 includes an image construction section 320, a concavity-convexity information extraction section 340, a storage section 350, an enhancement processing section 370, a distance information acquisition section 380, and a known characteristic information selection section 390. FIG. 9 illustrates a detailed configuration example of the distance information acquisition section 380. The distance information acquisition section 380 illustrated in FIG. 9 includes a selection distance information acquisition section 381 and a distance map acquisition section 382. Note that the same elements as those described above in connection with the first embodiment and the second embodiment are respectively indicated by the same reference signs, and description thereof is appropriately omitted. The endoscope apparatus may be configured in the same manner as in the first embodiment, for example.

In the third embodiment, the selection distance information acquisition section 381 acquires the selection distance information, and the known characteristic information selection section 390 selects the known characteristic information based on the selection distance information. The distance map acquisition section 382 acquires the distance map based on the selected known characteristic information. Specifically, the distance map acquisition section 382 decreases the resolution of the distance map as the size of the concavity-convexity part indicated by the selected known characteristic information increases. For example, when calculating the distance map by stereo imaging, the resolution of the distance map is changed by changing the interval (pixel thinning interval) between the pixels subjected to the stereo matching process. Since the size of the concavity-convexity part is large when the known characteristic information corresponding to screening observation has been selected based on the selection distance information, the interval between the pixels subjected to the stereo matching process is increased to decrease the number of pixels of the distance map. In this case, the lower limit of the size of the concavity-convexity part included in the distance map increases, and the size of the concavity-convexity part extracted from the distance map also increases. Since the size of the concavity-convexity part is small when the known characteristic information corresponding to zoom observation has been selected based on the selection distance information, the interval between the pixels subjected to the stereo matching process is decreased to increase the number of pixels of the distance map. In this case, the lower limit of the size of the concavity-convexity part included in the distance map decreases, and the size of the concavity-convexity part extracted from the distance map also decreases.

The concavity-convexity information extraction section 340 acquires identical known characteristic information from the storage section 350 independently of the selection distance information, sets the characteristics of the concavity-convexity extraction process based on the known characteristic information, and performs the concavity-convexity extraction process using the set characteristics. The details of the concavity-convexity extraction process are the same as described above in connection with the first embodiment. The characteristics of the concavity-convexity extraction process are identical independently of the selection distance information. However, since the resolution of the distance information differs depending on the selection distance information, the size of the extracted concavity-convexity information differs depending on the selection distance information.

4.2. Software

Figure 10:
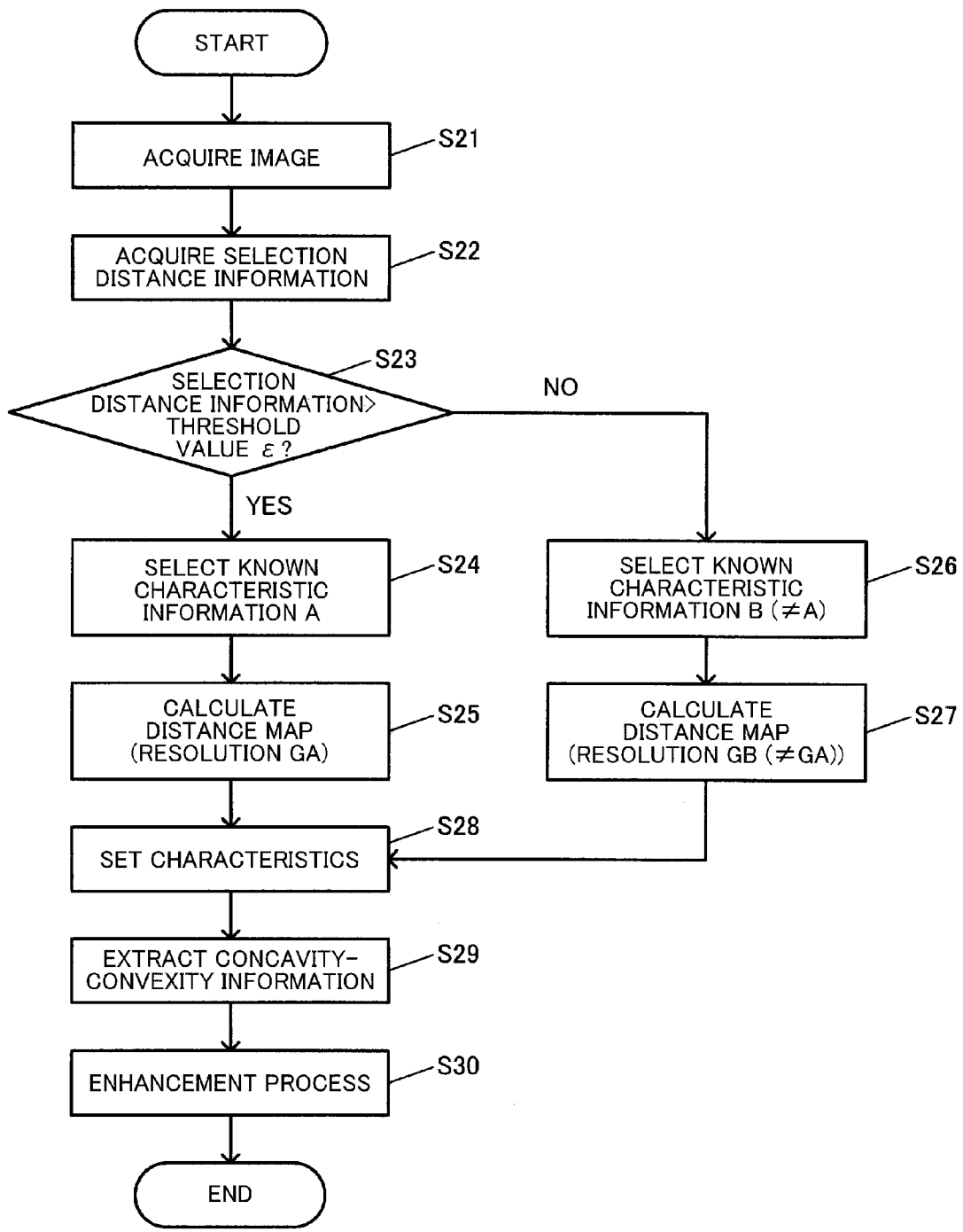
FIG. 10 is a flowchart of image processing (third embodiment).

FIG. 10 is a flowchart when the process performed by the image processing section 301 is implemented by software.

In a step S21, the captured image (stereo image) is acquired. The selection distance information is acquired from the captured image (step S22).

Whether or not the selection distance information is larger than the threshold value $\epsilon$ is determined (step S23). When the selection distance information is larger than the threshold value $\epsilon$, known characteristic information A corresponding to screening observation is selected (step S24), and the distance map having a resolution GA corresponding to the known characteristic information A is calculated from the stereo image (step S25). When the selection distance information is equal to or smaller than the threshold value $\epsilon$, known characteristic information B ($\neq$A) corresponding to zoom observation is selected (step S26), and the distance map having a resolution GB ($\neq$GA) corresponding to the known characteristic information B is calculated from the stereo image (step S27).

The characteristics of the concavity-convexity extraction process are set (step S28), and the concavity-convexity extraction process is performed on the distance map acquired in the step S25 or S27 using the characteristics set in the step S28 to extract the concavity-convexity information (step S29). The enhancement process is performed on the captured image based on the extracted concavity-convexity information (step S30) to complete the process.

According to the third embodiment, the distance information acquisition section 380 may acquire the selection distance information for selecting the known characteristic information as the distance information. The known characteristic information selection section 390 may select the known characteristic information based on the selection distance information. The distance information acquisition section 380 may acquire the distance map having a resolution based on the selected known characteristic information that has been selected corresponding to the selection distance information as the distance information. The concavity-convexity information extraction section 340 may extract the extracted concavity-convexity information from the distance map.

According to this configuration, the load imposed by the distance map acquisition process can be reduced by determining the observation state based on the selection distance information. Specifically, the selection distance information includes only a small amount of data (e.g., the distance in the center area of the image) as compared with the distance map for extracting the concavity-convexity information since it suffices that the observation state can be determined based on the selection distance information. Since the number of pixels of the distance map can be reduced when it has been determined that screening observation is performed based on the selection distance information, the repeat count of the stereo matching process decreases, and the processing load is reduced.

Moreover, the lower limit (i.e., the extractable size lower limit) of the size of the concavity-convexity part included in the distance map can be changed corresponding to the selection distance information by extracting the concavity-convexity information from the distance map having a resolution corresponding to the selection distance information. This makes it possible to extract the concavity-convexity information having a size corresponding to the observation state. The concavity-convexity part can thus be adaptively detected corresponding to the observation state in the same manner as in the first embodiment.

5. Fourth Embodiment 5.1. Image Processing Section

Figure 13:
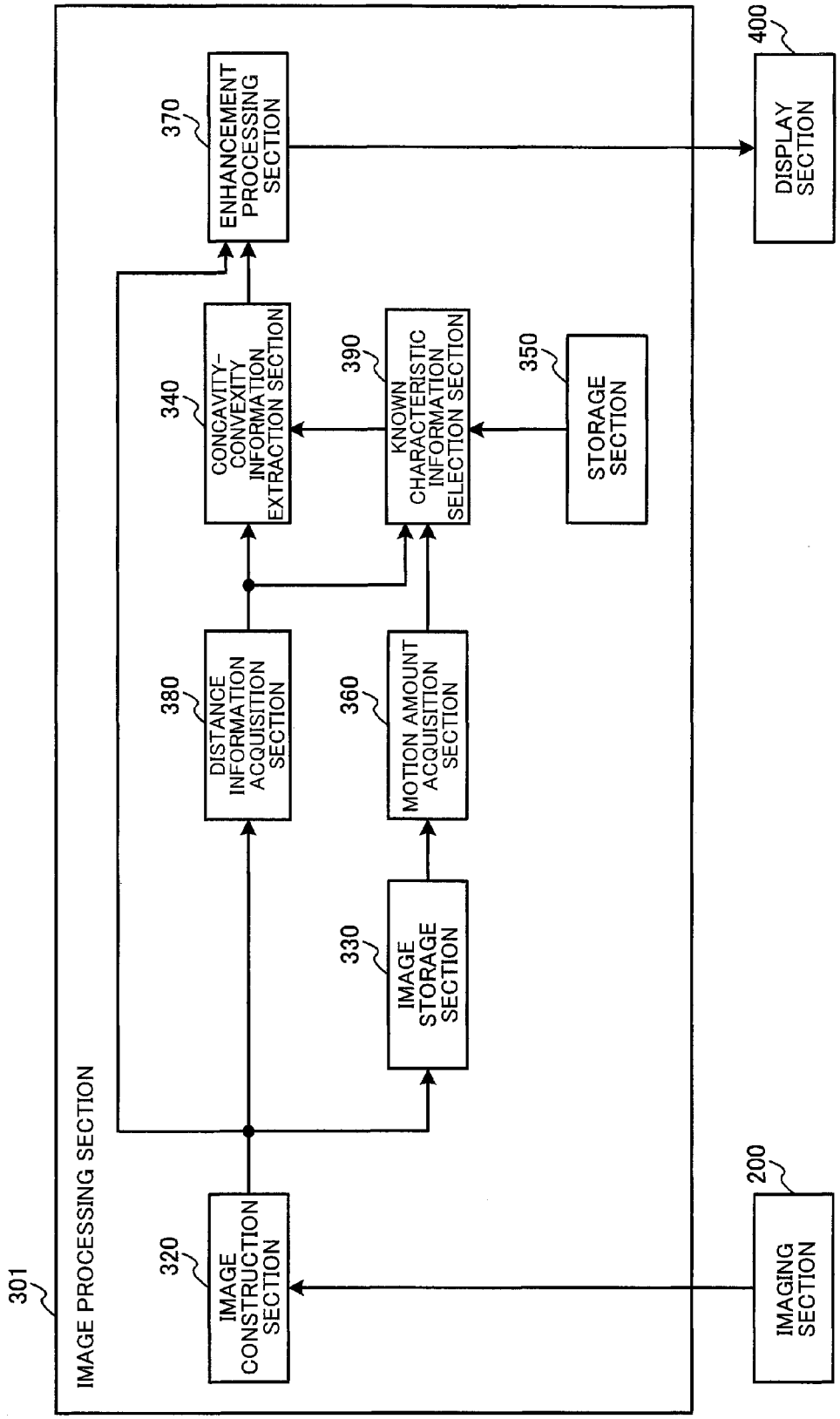
FIG. 13 illustrates a detailed configuration example of an image processing section (fourth embodiment).

FIG. 13 illustrates a detailed configuration example of an image processing section 301 according to a fourth embodiment of the invention. The image processing section 301 illustrated in FIG. 13 includes an image construction section 320, an image storage section 330, a concavity-convexity information extraction section 340, a storage section 350, a motion amount acquisition section 360, an enhancement processing section 370, a distance information acquisition section 380, and a known characteristic information selection section 390. Note that the same elements as those described above in connection with the first embodiment, the second embodiment, and the third embodiment are respectively indicated by the same reference signs, and description thereof is appropriately omitted. The endoscope apparatus may be configured in the same manner as in the first embodiment, for example.

The image storage section 330 stores the images output from the image construction section 320 corresponding to a plurality of frames (i.e., a plurality of time-series (consecutive) frames).

The motion amount acquisition section 360 calculates the motion amount of the object within the captured image based on the images corresponding to a plurality of frames that are stored in the image storage section 330, and outputs the motion amount to the known characteristic information selection section 390. For example, the motion amount acquisition section 360 performs a matching process on the image corresponding to a reference frame and the image corresponding to the subsequent frame to calculate the motion vector between the images (frame images). The motion amount acquisition section 360 sequentially calculates a plurality of motion vectors over a plurality of frames while shifting the reference image by one frame, and calculates the average value of the plurality of motion vectors as the motion amount.

The known characteristic information selection section 390 selects the known characteristic information corresponding to the selection distance information and the motion amount, reads the selected known characteristic information from the storage section 350, and outputs the selected known characteristic information to the concavity-convexity information extraction section 340. It is possible to deal with the case where it is difficult to determine the observation state using only the distance information by utilizing the motion amount in addition to the distance information, and implement a concavity-convexity detection process that is more appropriate for the observation state.

For example, the global average distance within the captured image, the distance within a given representative area, or the like is acquired as the selection distance information. The global average motion amount within the captured image, the motion amount within a given representative area, or the like is acquired as the motion amount. When the distance in the center area of the image is used as the selection distance information, it is considered that the digestive tract and the optical axis of the scope are almost parallel to each other when screening observation is performed. In this case, the selection distance information increases. On the other hand, it is considered that the scope directly faces the wall of the digestive tract when zoom observation is performed. In this case, the selection distance information decreases. However, the optical axis of the scope may be situated diagonally to the wall of the digestive tract (intermediate state). For example, screening observation may be performed while causing the scope to face the wall of the digestive tract, or it may be difficult to cause the scope to directly face the wall of the digestive tract during zoom observation due to the shape of the digestive tract. In such a case, the selection distance information indicates an intermediate state between the above two states, and it is difficult to determine whether the observation state is the screening observation state or the zoom observation state using only the selection distance information.

Therefore, the observation state may be determined taking account of the motion amount. Specifically, a distance threshold value is provided between the case where the scope is situated along the digestive tract and the case where the scope is situated diagonally to the wall of the digestive tract. The known characteristic information that corresponds to screening observation is selected when the motion amount is larger than a motion amount threshold value independently of whether or not the selection distance information is equal to or smaller than the distance threshold value (e.g., whether or not the scope is situated diagonally to the wall of the digestive tract or directly faces the wall of the digestive tract). This makes it possible to select correct known characteristic information based on the motion amount even when it is difficult to determine the observation state using only the selection distance information.

The following operation may be employed when the above condition is not satisfied, for example. Specifically, the known characteristic information that corresponds to screening observation is selected when the selection distance information is larger than the distance threshold value, or when the motion amount is larger than the motion amount threshold value. The known characteristic information that corresponds to zoom observation is selected when the selection distance information is equal to or smaller than the distance threshold value, and the motion amount is equal to or smaller than the motion amount threshold value.

The distances at a plurality of positions (e.g., the distance in the center area of the captured image, and the distance in the peripheral area (e.g., an area around each corner) of the captured image) may be acquired as the selection distance information. The motion amount at a plurality of positions (e.g., the motion amount in the center area of the captured image, and the motion amount in the peripheral area (e.g., an area around each corner) of the captured image) may be acquired as the motion amount. Since the scope is normally inserted along the digestive tract during screening observation, the deep area of the digestive tract is captured in the center area of the image, and the wall of the digestive tract is captured in the peripheral area of the image. Therefore, the motion amount in the peripheral area of the image is larger than the motion amount in the center area of the image. Since the scope directly faces the object during zoom observation, the motion amount is small over the entire image during zoom observation. It is possible to determine the observation state using such a motion amount pattern. For example, the known characteristic information that corresponds to screening observation may be selected when the distance information pattern or the motion amount pattern corresponds to screening observation. The known characteristic information that corresponds to zoom observation may be selected when the distance information pattern and the motion amount pattern correspond to zoom observation.

5.2. Software

Figure 14:
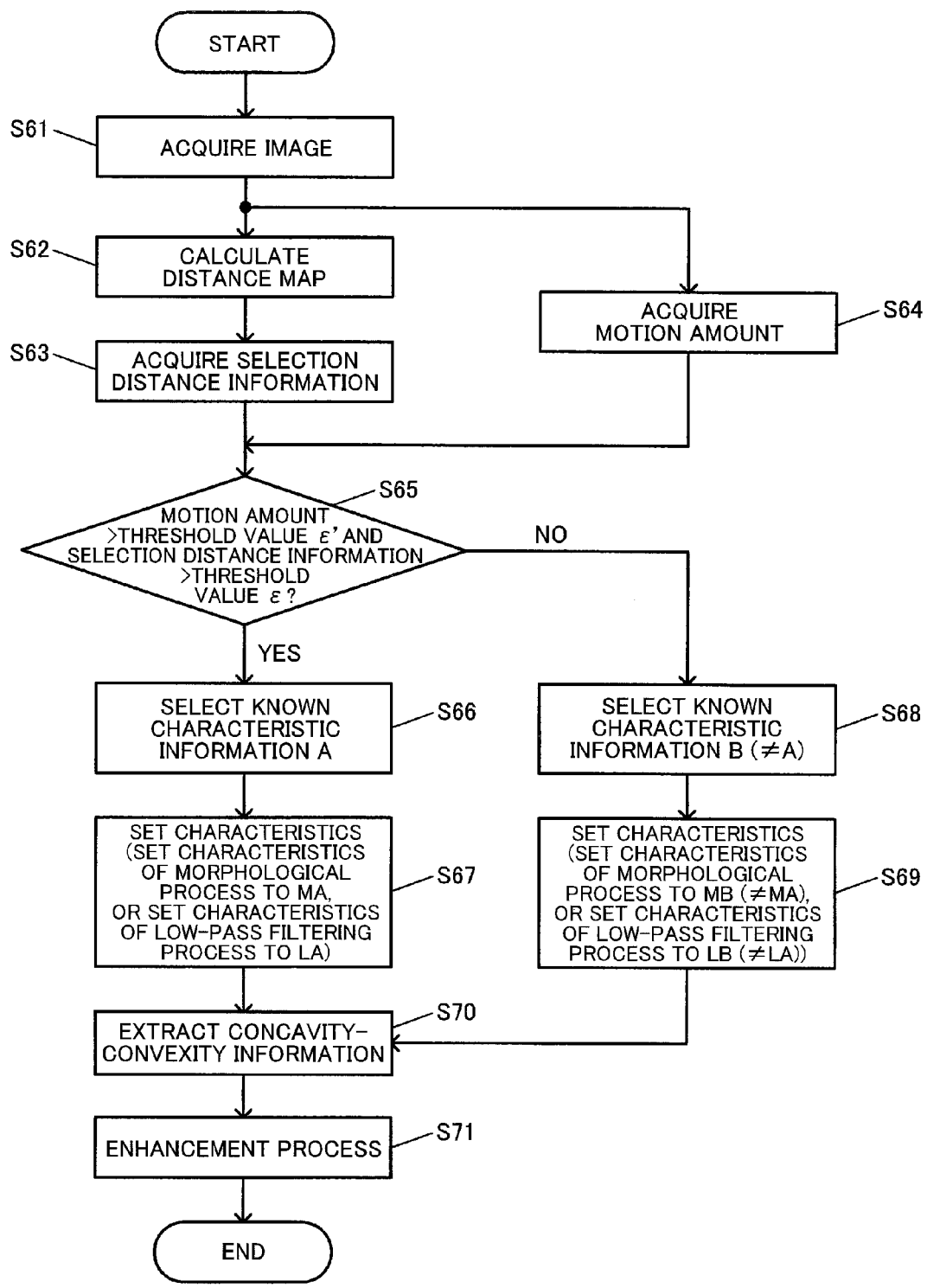
FIG. 14 is a flowchart of image processing (fourth embodiment).

FIG. 14 is a flowchart when the process performed by the image processing section 301 is implemented by software.

In a step S61, the captured image (stereo image) is acquired. The stereo matching process is performed to acquire the distance map (step S62), and the selection distance information is acquired from the distance map (step S63). The motion amount is acquired from the captured image (step S64).

Whether or not the motion amount is larger than a threshold value $\epsilon'$, and whether or not the selection distance information is larger than the threshold value $\epsilon$ are determined (step S65). When the motion amount is larger than the threshold value $\epsilon'$, or when the selection distance information is larger than the threshold value $\epsilon$, known characteristic information A corresponding to screening observation is selected (step S66), and the characteristics of the concavity-convexity extraction process are set based on the known characteristic information A (step S67). Specifically, the characteristics (e.g., the diameter of a sphere) of the morphological process are set to MA based on the known characteristic information A, or the characteristics (e.g., cut-off frequency) of the low-pass filtering process are set to LA based on the known characteristic information A. When the motion amount is equal to or smaller than the threshold value $\epsilon'$, and the selection distance information is equal to or smaller than the threshold value $\epsilon$, known characteristic information B ($\neq$A) corresponding to zoom observation is selected (step S68), and the characteristics of the concavity-convexity extraction process are set based on the known characteristic information B (step S69). For example, the characteristics of the morphological process are set to MB ($\neq$MA) based on the known characteristic information B, or the characteristics of the low-pass filtering process are set to LB ($\neq$LA) based on the known characteristic information B.

The concavity-convexity information is extracted based on the characteristics set in the step S67 or S69 (step S70). The enhancement process is performed on the captured image based on the extracted concavity-convexity information (step S71) to complete the process.

According to the fourth embodiment, the image processing device (image processing section 301) may include the motion amount acquisition section 360 that acquires the motion amount of the object. The known characteristic information selection section 390 may select the known characteristic information corresponding to the distance information and the motion amount.

According to this configuration, it is possible to determine the observation state taking account of the motion amount even when it is difficult to determine the observation state using only the distance information (e.g., when the optical axis of the scope is situated diagonally to the wall of the digestive tract). This makes it possible to improve the detection accuracy of concavities and convexities corresponding to the observation state, and present more appropriate concavity-convexity information to the user.

The term "motion amount" used herein refers to the motion amount of the object within the captured image (e.g., the motion velocity and the motion direction of the object within the captured image). The motion vector (motion velocity and motion direction) may be acquired as the motion amount, or only the magnitude of the motion vector may be acquired as the motion amount when it suffices to determine the motion velocity. Alternatively, the motion amount may be a combination of the motion amounts (or a pattern thereof) at a plurality of positions within the captured image. Since the motion amount within the captured image is not necessarily uniform, a motion amount (or a pattern thereof) that differs depending on the position can be represented by combining the motion amounts at a plurality of positions within the captured image.

The image processing device and the like according to the embodiments of the invention may include a processor and a memory. The processor may be a central processing unit (CPU), for example. Note that the processor is not limited to a CPU. Various types of processors such as a graphics processing unit (GPU) or a digital signal processor (DSP) may also be used. The processor may be a hardware circuit that includes an ASIC. The memory stores a computer-readable instruction. Each section of the image processing device and the like according to the embodiments of the invention is implemented by causing the processor to execute the instruction. The memory may be a semiconductor memory (e.g., SRAM or DRAM), a register, a hard disk, or the like. The instruction may be an instruction included in an instruction set of a program, or may be an instruction that causes a hardware circuit of the processor to operate.

The embodiments according to the invention and the modifications thereof have been described above. Note that the invention is not limited to the above embodiments and the modifications thereof. Various modifications and variations may be made of the above embodiments and the modifications thereof without departing from the scope of the invention. A plurality of elements described in connection with the above embodiments and the modifications thereof may be appropriately combined to implement various configurations. For example, some of the elements described in connection with the above embodiments and the modifications thereof may be omitted. Some of the elements described above in connection with different embodiments or modifications thereof may be appropriately combined. Specifically, various modifications and applications are possible without materially departing from the novel teachings and advantages of the invention. Any term cited with a different term having a broader meaning or the same meaning at least once in the specification and the drawings can be replaced by the different term in any place in the specification and the drawings.

What is claimed is:

1. An image processing device comprising:
a processor comprising hardware, the processor being configured to implement:
an image acquisition section that acquires a captured image, the captured image having been captured by an imaging section, and the captured image including an image of an object;
a distance information acquisition section that acquires distance information based on a distance from the imaging section to the object when the imaging section has captured the captured image;
a known characteristic information selection section that selects known characteristic information corresponding to the distance information, and outputs the selected known characteristic information, the known characteristic information being information that indicates known characteristics relating to a structure of the object; and
a concavity-convexity information extraction section that extracts information that indicates a concavity-convexity part of the object that meets the known characteristics specified by the selected known characteristic information from the distance information as extracted concavity-convexity information;

the known characteristic information selection section determining whether an observation state is a screening observation state or a zoom observation state based on the distance information, and selecting the known characteristic information corresponding to the determined observation state;
the known characteristic information being information that corresponds to a size relating to the structure, and
the known characteristic information selection section selecting the known characteristic information that corresponds to a first size when the known characteristic information selection section has determined that the distance information corresponds to distance information when screening observation is performed on the object, and selecting the known characteristic information that corresponds to a second size that is smaller than the first size when the known characteristic information selection section has determined that the distance information corresponds to distance information when zoom observation is performed on the object.

2. The image processing device as defined in claim 1,
the known characteristic information selection section selecting the known characteristic information that corresponds to the first size when the distance information is larger than a threshold value, and selecting the known characteristic information that corresponds to the second size that is smaller than the first size when the distance information is smaller than the threshold value.

3. The image processing device as defined in claim 1,
the concavity-convexity information extraction section determining an extraction process parameter based on the known characteristic information selected corresponding to the distance information, and extracting the extracted concavity-convexity information based on the determined extraction process parameter.

4. The image processing device as defined in claim 3,
the concavity-convexity information extraction section determining frequency characteristics of a filtering process performed on the distance information as the extraction process parameter based on the selected known characteristic information, and performing the filtering process using the determined frequency characteristics to extract the extracted concavity-convexity information.

5. The image processing device as defined in claim 1,
the concavity-convexity information extraction section extracting the information that indicates the concavity-convexity part of the object that meets the known characteristics specified by the known characteristic information from the distance information, and performing a filtering process on the extracted information that indicates the concavity-convexity part using frequency characteristics based on the known characteristic information selected corresponding to the distance information to extract the extracted concavity-convexity information.

6. The image processing device as defined in claim 1,
the distance information acquisition section acquiring selection distance information for selecting the known characteristic information as the distance information, and
the known characteristic information selection section selecting the known characteristic information based on the selection distance information.

7. The image processing device as defined in claim 6,
the distance information acquisition section acquiring a distance map having a resolution that corresponds to the known characteristic information selected corresponding to the selection distance information as the distance information, and the concavity-convexity information extraction section extracting the extracted concavity-convexity information from the distance map.

8. The image processing device as defined in claim 1, wherein the processor is further configured to implement a motion amount acquisition section that acquires a motion amount of the object, the known characteristic information selection section selecting the known characteristic information corresponding to the distance information and the motion amount.

9. An endoscope apparatus comprising the image processing device as defined in claim 1.

10. An image processing method comprising:

acquiring a captured image, the captured image having been captured by an imaging section, and the captured image including an image of an object;

acquiring distance information based on a distance from the imaging section to the object when the imaging section has captured the captured image;

selecting known characteristic information corresponding to the distance information, and outputting the selected known characteristic information, the known characteristic information being information that indicates known characteristics relating to a structure of the object; and extracting information that indicates a concavity-convexity part of the object that meets the known characteristics specified by the selected known characteristic information from the distance information as extracted concavity-convexity information;

the selecting the known characteristic information further comprising determining whether an observation state is a screening observation state or a zoom observation state based on the distance information, and selecting the known characteristic information corresponding to the determined observation state;

the known characteristic information being information that corresponds to a size relating to the structure, and the selecting the known characteristic information further comprising selecting the known characteristic information that corresponds to a first size when it has been determined that the distance information corresponds to distance information when screening observation is performed on the object, and selecting the known characteristic information that corresponds to a second size that is smaller than the first size when it has been determined that the distance information corresponds to distance information when zoom observation is performed on the object.

11. A non-transitory computer-readable storage device with an executable program stored thereon, wherein the program instructs a computer to perform steps of:

acquiring a captured image, the captured image having been captured by an imaging section, and the captured image including an image of an object;

acquiring distance information based on a distance from the imaging section to the object when the imaging section has captured the captured image;

selecting known characteristic information corresponding to the distance information, and outputting the selected known characteristic information, the known characteristic information being information that indicates known characteristics relating to a structure of the object; and extracting information that indicates a concavity-convexity part of the object that meets the known characteristics specified by the selected known characteristic information from the distance information as extracted concavity-convexity information;

the selecting the known characteristic information further comprising determining whether an observation state is a screening observation state or a zoom observation state based on the distance information, and selecting the known characteristic information corresponding to the determined observation state;

the known characteristic information being information that corresponds to a size relating to the structure, and the selecting the known characteristic information further comprising selecting the known characteristic information that corresponds to a first size when it has been determined that the distance information corresponds to distance information when screening observation is performed on the object, and selecting the known characteristic information that corresponds to a second size that is smaller than the first size when it has been determined that the distance information corresponds to distance information when zoom observation is performed on the object.

12. An image processing device comprising:

a processor comprising hardware, the processor being configured to implement:

an image acquisition section that acquires a captured image, the captured image having been captured by an imaging section, and the captured image including an image of an object;

a distance information acquisition section that acquires distance information based on a distance from the imaging section to the object when the imaging section has captured the captured image;

a known characteristic information selection section that selects known characteristic information corresponding to the distance information, and outputs the selected known characteristic information, the known characteristic information being information that indicates known characteristics relating to a structure of the object; and a concavity-convexity information extraction section that extracts information that indicates a concavity-convexity part of the object that meets the known characteristics specified by the selected known characteristic information from the distance information as extracted concavity-convexity information;

the concavity-convexity information extraction section determining an extraction process parameter based on the known characteristic information selected corresponding to the distance information, and extracting the extracted concavity-convexity information based on the determined extraction process parameter;

the concavity-convexity information extraction section determining a size of a structural element used for an opening process and a closing process as the extraction process parameter based on the selected known characteristic information, and performing the opening process and the closing process using the structural element having the determined size to extract the extracted concavity-convexity information.

* * * * *